United States Patent
Tie et al.

(10) Patent No.: US 10,165,581 B2
(45) Date of Patent: Dec. 25, 2018

(54) MACHINE TYPE COMMUNICATION SCHEDULING METHOD, BASE STATION, AND USER EQUIPMENT

(71) Applicant: Huawei Technologies Co., Ltd., Shenzhen (CN)

(72) Inventors: Xiaolei Tie, Shanghai (CN); Yinghui Yu, Beijing (CN); Lei Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/821,313

(22) Filed: Nov. 22, 2017

(65) Prior Publication Data

US 2018/0098334 A1   Apr. 5, 2018

Related U.S. Application Data

(63) Continuation of application No. PCT/CN2016/083310, filed on May 25, 2016.

(30) Foreign Application Priority Data

May 26, 2015 (CN) .......................... 2015 1 0274653

(51) Int. Cl.
*H04W 72/12* (2009.01)
*H04W 72/04* (2009.01)
(Continued)

(52) U.S. Cl.
CPC ............ *H04W 72/12* (2013.01); *H04W 4/70* (2018.02); *H04W 28/0205* (2013.01);
(Continued)

(58) Field of Classification Search
CPC ... H04W 72/12; H04W 28/0205; H04W 4/70; H04W 72/042; H04W 88/08; H04W 88/02
(Continued)

(56) References Cited

U.S. PATENT DOCUMENTS

2007/0259675 A1   11/2007   Worrall
2013/0182626 A1   7/2013   Kuo
(Continued)

FOREIGN PATENT DOCUMENTS

| CN | 101467477 A | 6/2009 |
| CN | 102202394 A | 9/2011 |
| CN | 103378939 A | 10/2013 |

OTHER PUBLICATIONS

Foreign Communication From a Counterpart Application, European Application No. 16799319.5, Extended European Search Report dated Apr. 5, 2018, 7 pages.
(Continued)

*Primary Examiner* — Inder P Mehra
(74) *Attorney, Agent, or Firm* — Conley Rose, P.C.

(57) ABSTRACT

A machine type communication (MTC) scheduling method, a base station, and a user equipment (UE). An embodiment of a method in the embodiments of the present disclosure includes sending, by a base station, first downlink control information (DCI) to the UE in an air-interface idle mode in a cell, where the first DCI includes a first resource indicator corresponding to a first identifier of target UE, and the first identifier identifies, during resource scheduling, the target UE in the air-interface idle mode that is scheduled by the base station, and sending, by the base station, a first data packet to the target UE according to the first resource indicator.

16 Claims, 9 Drawing Sheets

(51) Int. Cl.
    *H04W 28/02*     (2009.01)
    *H04W 4/70*     (2018.01)
    *H04W 88/08*     (2009.01)
    *H04W 88/02*     (2009.01)

(52) U.S. Cl.
    CPC .......... *H04W 72/042* (2013.01); *H04W 88/02* (2013.01); *H04W 88/08* (2013.01)

(58) Field of Classification Search
    USPC ....................................................... 455/450
    See application file for complete search history.

(56) References Cited

U.S. PATENT DOCUMENTS

| | | | |
|---|---|---|---|
| 2013/0260801 A1* | 10/2013 | Kim | H04W 68/02 455/458 |
| 2015/0103768 A1* | 4/2015 | Chen | H04W 68/025 370/329 |
| 2016/0316416 A1* | 10/2016 | Raval | H04W 48/02 |
| 2017/0202053 A1* | 7/2017 | Rune | H04W 74/0833 |
| 2018/0276675 A1* | 9/2018 | Clark | G06Q 30/0185 |

OTHER PUBLICATIONS

Machine Translation and Abstract of Chinese Publication CN102202394, Sep. 28, 2011, 18 pages.
Foreign Communication From a Counterpart Application, PCT Application No. PCT/CN2016/083310, English Translation of International Search Report dated Aug. 22, 2016, 2 pages.

\* cited by examiner

MACHINE TYPE COMMUNICATION SCHEDULING METHOD, BASE STATION, AND USER EQUIPMENT

CROSS-REFERENCE TO RELATED APPLICATIONS

This application is a continuation of International Patent Application No. PCT/CN2016/083310 filed on May 25, 2016, which claims priority to Chinese Patent Application No. 201510274653.3 filed on May 26, 2015. The disclosures of the aforementioned applications are hereby incorporated by reference in their entireties.

TECHNICAL FIELD

The present disclosure relates to the field of communications technologies, and in particular, to a machine type communication (MTC) scheduling method, a base station, and user equipment (UE).

BACKGROUND

An MTC or Cellular Internet of Things (CIoT) technology is a combination of wireless communications and information technologies, is used for bidirectional communication, and is applicable to fields such as security monitoring, vending machines, freight tracking, and meter reading. According to communication objects, MTC may include three communication modes, machine-to-machine (M2M), machine-to-mobile terminal (for example, remote monitoring by a user), and mobile terminal-to-machine (for example, remote control by a user). The MTC is an important application in a future communications field, and future MTC may mainly include smart metering, medical detection, logistics detection, fire detection, wearable device communication, and the like. It is predicted that a quantity of connected MTC devices will reach 50 billion by 2022.

Currently, two main core network architectures in third generation partnership project (3GPP) are a Gb-based architecture used in Global System for Mobile Communications (GSM) and General Packet Radio Service (GPRS) networks and an S 1-based architecture used in an long term evolution (LTE) network, and the two architectures have respective advantages and disadvantages. Therefore, both the Gb-based architecture and the S 1-based architecture should be compatible as much as possible in a new MTC access network. Therefore, discontinuous reception in an air-interface connected mode needs to be supported in a new MTC access network design. In the S 1-based architecture, because there is a connection between a base station and a core network, and an access stratum (AS) (in an idle mode and a connected mode) and a non-AS (NAS) (in an idle mode and a connected mode) of UE are consistent, no problem occurs. In the Gb-based architecture, an air interface mode is not maintained by signaling to a core network device. Instead, a ready timer between a core network device and a base station is set and an AS timer (AS timer) that is between a base station and the UE and that controls an air interface mode is maintained. Therefore, in the MTC access network design, a ready timer that controls the core network device to send data to the base station is maintained between the core network device and the UE, and an AS timer that controls the air interface mode is maintained between the base station and the UE.

Compared with a conventional service, an MTC service has some new characteristics. For example, a time for sending the MTC service is usually quite long. Consequently, a time for sending by UE on an air interface is quite long, further, there may be a conflict between a ready timer between a base station and a core network device and an AS timer between a base station and the terminal, and therefore, the core network device cannot directly send a downlink data packet to the UE. In a case, the ready timer does not expire, and in this case, the core network device directly sends the downlink data to the base station. However, in this case, because the AS timer between the base station and the terminal has expired, an air interface of the UE has been released, the UE is in an air-interface idle mode, and the base station cannot schedule the UE and send the corresponding downlink data packet. In another case, the ready timer expires, but the AS timer does not expire. Because the ready timer expires, when the core network device needs to send the downlink data to the UE, the core network device does not directly forward the data to the corresponding base station. Instead, the core network device sends a paging request, and the base station sends a paging message. Because the AS timer does not expire, the UE is still in a connected mode, the UE listens only to scheduling that is based on a Cell-Radio Network Temporary Identity (C-RNTI) of the UE, and the downlink data cannot be sent to the UE using the base station.

SUMMARY

Embodiments of the present disclosure provide an MTC scheduling method, a base station, and UE. On one hand, a problem that when UE is in an air-interface idle mode, a base station cannot schedule the UE and send a corresponding downlink data packet is avoided. On the other hand, a problem that when a ready timer maintained between a base station and a core network device expires, downlink data that the core network device needs to send to target UE cannot be sent to the target UE because the UE listens only to scheduling that is based on a C-RNTI identifier of the UE is avoided.

A first aspect of the embodiments of the present disclosure provides an MTC scheduling method, including sending, by a base station, first downlink control information (DCI) to UE in an air-interface idle mode in a serving cell of the base station, where the first DCI includes a first resource indicator corresponding to a first identifier of target UE, the first identifier is an identifier used by the base station for scheduling the target UE when the target UE is in the air-interface idle mode, the first resource indicator is used to indicate a resource used by the target UE during resource scheduling, and the resource includes a downlink resource, and sending, by the base station, a first data packet to the target UE using the downlink resource.

With reference to the first aspect of the embodiments of the present disclosure, in a first possible implementation of the first aspect of the embodiments of the present disclosure, the first identifier is an identifier of a preset type, and the first data packet includes a correspondence between a second identifier and a third identifier of the target UE such that the target UE obtains the second identifier according to the third identifier of the target UE after receiving the first data packet. The second identifier is an identifier that is newly allocated by the base station to the target UE in the air-interface idle mode and that is used for entering an air-interface connected mode by the target UE, and the third identifier is used to identify the target UE between the target UE and a core network device.

With reference to the first possible implementation of the first aspect of the embodiments of the present disclosure, in a second possible implementation of the first aspect of the embodiments of the present disclosure, the first DCI further includes a second resource indicator corresponding to the second identifier, and the method further includes allocating, by the base station, a downlink resource to the target UE according to the second resource indicator, and sending, by the base station, a second data packet on the downlink resource, or allocating, by the base station, an uplink resource to the target UE according to the second resource indicator such that the target UE sends a third data packet on the uplink resource.

With reference to the second possible implementation of the first aspect of the embodiments of the present disclosure, in a third possible implementation of the first aspect of the embodiments of the present disclosure, sending, by a base station, first DCI to UE in an air-interface idle mode in a serving cell of the base station includes sending, by the base station, the first DCI to the target UE when an AS timer in the base station expires, allocating, by the base station, the downlink resource to the target UE according to the second resource indicator, and sending, by the base station, the second data packet on the downlink resource, where when a ready timer in the core network device does not expire, the second data packet is sent by the core network device to the base station, and the method further includes sending, by the base station, second DCI to the target UE when the AS timer in the base station does not expire, where the second DCI includes a third resource indicator corresponding to a fourth identifier of the target UE such that the target UE obtains the third resource indicator according to the fourth identifier of the target UE after receiving the second DCI, where the fourth identifier is an identifier used for scheduling a resource when the target UE is in the air-interface connected mode, and the fourth identifier and the second identifier are identifiers of one type.

With reference to the second possible implementation of the first aspect of the embodiments of the present disclosure, in a fourth possible implementation of the first aspect of the embodiments of the present disclosure, sending, by a base station, first DCI to UE in an air-interface idle mode in a serving cell of the base station includes sending the first DCI to the target UE when the base station receives paging request signaling sent by the core network device, and an AS timer in the base station expires, and allocating, by the base station, the uplink resource to the target UE according to the second resource indicator such that the target UE sends the third data packet on the uplink resource, where the third data packet is a paging response message sent by the target UE to the core network device, and the first data packet is a paging message sent by the base station at a preset time.

With reference to the first aspect, or the first possible implementation of the first aspect of the embodiments of the present disclosure, in a fifth possible implementation of the first aspect of the embodiments of the present disclosure, the first identifier of the target UE is a Paging-Radio Network Temporary Identity (P-RNTI) identifier of the target UE, and the P-RNTI identifier is calculated by the base station and the UE according to a preset rule. The second identifier of the target UE is a C-RNTI identifier of the target UE, and the C-RNTI identifier is allocated by the base station to the UE, and the third identifier of the target UE is a temporary logical link identifier (TLLI) or an international mobile subscriber identity (IMSI) of the target UE.

With reference to the first aspect of the embodiments of the present disclosure, in a sixth possible implementation of the first aspect of the embodiments of the present disclosure, the first identifier of the target UE is a TLLI of the target UE.

A second aspect of the embodiments of the present disclosure provides an MTC scheduling method, including listening, by the UE at a preset time, to first DCI sent by a base station when UE is in an air-interface idle mode, obtaining, by the UE, a first resource indicator corresponding to the first identifier if the first DCI includes scheduling information corresponding to a first identifier of the UE, where the first identifier is an identifier used by the base station for scheduling the target UE when the target UE is in the air-interface idle mode, the first resource indicator is used to indicate a resource used by the target UE during resource scheduling, and the resource includes a downlink resource, and receiving, by the UE on the downlink resource, a first data packet sent by the base station.

With reference to the second aspect of the embodiments of the present disclosure, in a first possible implementation of the second aspect of the embodiments of the present disclosure, the first identifier is an identifier of a preset type, and after receiving, by the UE on the downlink resource, a first data packet sent by the base station, the method further includes searching, by the UE, the first data packet for a correspondence between a second identifier and a third identifier of the UE, where the second identifier is an identifier that is newly allocated by the base station to the UE in the air-interface idle mode and that is used for entering an air-interface connected mode by the UE, and the third identifier is used to identify the UE between the UE and a core network device, and if the UE obtains the correspondence between the second identifier and the third identifier of the UE by searching the first data packet, obtaining, by the UE, the second identifier according to the third identifier of the UE, and receiving scheduling information and user data using the second identifier as identification information used in the air-interface connected mode.

With reference to the first possible implementation of the second aspect of the embodiments of the present disclosure, in a second possible implementation of the second aspect of the embodiments of the present disclosure, the method further includes searching, by the UE, the first DCI for a second resource indicator corresponding to the second identifier, and if the first DCI includes the second resource indicator corresponding to the second identifier, receiving, by the UE according to a downlink resource indicated by the second resource indicator, a second data packet sent by the base station, or sending a third data packet according to an uplink resource indicated by the second resource indicator, and continuing, by the UE, to listen to subsequent DCI to determine whether the base station schedules the UE if the first DCI does not include the second resource indicator corresponding to the second identifier.

With reference to the second possible implementation of the second aspect of the embodiments of the present disclosure, in a third possible implementation of the second aspect of the embodiments of the present disclosure, when the UE sends the third data packet according to the uplink resource indicated by the second resource indicator, the third data packet is a paging response message sent by the UE to the core network device, and the first data packet is a paging message sent by the base station at a preset time.

With reference to any one of the second aspect, the first possible implementation of the second aspect, the second possible implementation of the second aspect, or the third possible implementation of the second aspect of the embodiments of the present disclosure, in a fourth possible implementation of the second aspect of the embodiments of the present disclosure, the first identifier of the UE is a P-RNTI identifier of the UE, and the P-RNTI identifier is calculated by the base station and the UE according to a preset rule. The second identifier of the UE is a C-RNTI identifier of the UE, and the C-RNTI identifier is allocated by the base station to the UE, and the third identifier of the UE is a TLLI or an IMSI of the UE.

With reference to the second aspect of the embodiments of the present disclosure, in a fifth possible implementation of the second aspect of the embodiments of the present disclosure, the first identifier of the UE is a TLLI of the UE.

A third aspect of the embodiments of the present disclosure provides an MTC scheduling method, including receiving, by a base station, a paging instruction sent by a core network device, where the paging instruction includes a third identifier of target UE, and the third identifier is used to identify the target UE between UE and the core network device, searching, by the base station, a preset mapping relationship table according to the third identifier, where the mapping relationship table includes a one-to-one correspondence between a third identifier of the UE and a fourth identifier of the UE, and responding to the paging instruction of the core network device such that the core network device sends, to the base station, a downlink data packet that needs to be sent to the target UE if there is the third identifier of the target UE in the mapping relationship table, where the fourth identifier is used for scheduling a resource when the target UE is in an air-interface connected mode, receiving, by the base station, the downlink data packet sent by the core network device, obtaining, by the base station, a fourth identifier of the target UE by searching the mapping relationship table according to the third identifier of the target UE, scheduling, by the base station, a resource according to the fourth identifier of the target UE, and sending the downlink data packet to the target UE.

With reference to the third aspect of the embodiments of the present disclosure, in a first possible implementation of the third aspect of the embodiments of the present disclosure, scheduling a resource according to the fourth identifier of the target UE, and sending the downlink data packet to the target UE includes sending, by the base station, DCI to the target UE, where the DCI includes a resource indicator corresponding to the fourth identifier, the resource indicator is used to indicate a resource used by the target UE during resource scheduling, and the resource includes a downlink resource, and sending, by the base station, the downlink data packet to the target UE using the downlink resource.

With reference to the third aspect, or the first possible implementation of the third aspect of the embodiments of the present disclosure, in a second possible implementation of the third aspect of the embodiments of the present disclosure, the third identifier of the UE is a TLLI or an IMSI of the UE, and the fourth identifier of the UE is a C-RNTI identifier of the UE, and the C-RNTI identifier is allocated by the base station to the UE.

With reference to the second possible implementation of the third aspect of the embodiments of the present disclosure, in a third possible implementation of the third aspect of the embodiments of the present disclosure, the paging instruction sent by the core network device includes a TLLI of the target UE.

A fourth aspect of the embodiments of the present disclosure provides a base station, including a transceiver and a processor, where the transceiver is configured to send first DCI to UE in an air-interface idle mode in a serving cell of the base station, where the first DCI includes a first resource indicator corresponding to a first identifier of target UE, the first identifier is an identifier used by the base station for scheduling the target UE when the target UE is in the air-interface idle mode, the first resource indicator is used to indicate a resource used by the target UE during resource scheduling, and the resource includes a downlink resource, and the processor is configured to send a first data packet to the target UE using the downlink resource.

With reference to the fourth aspect of the embodiments of the present disclosure, in a first possible implementation of the fourth aspect of the embodiments of the present disclosure, the first identifier is an identifier of a preset type, and the first data packet includes a correspondence between a third identifier and a second identifier of the target UE such that the target UE obtains the second identifier according to the third identifier of the target UE after receiving the first data packet. The second identifier is an identifier that is newly allocated by the base station to the target UE in the air-interface idle mode and that is used for entering an air-interface connected mode by the target UE, and the third identifier is used to identify the target UE between the target UE and a core network device.

With reference to the first possible implementation of the fourth aspect of the embodiments of the present disclosure, in a second possible implementation of the fourth aspect of the embodiments of the present disclosure, the first DCI further includes a second resource indicator corresponding to the second identifier, and the processor is further configured to allocate a downlink resource to the target UE according to the second resource indicator, and the transceiver is further configured to send a second data packet on the downlink resource, or the processor is further configured to allocate an uplink resource to the target UE according to the second resource indicator such that the target UE sends a third data packet on the uplink resource.

With reference to the second possible implementation of the fourth aspect of the embodiments of the present disclosure, in a third possible implementation of the fourth aspect of the embodiments of the present disclosure, the transceiver is further configured to send the first DCI to the target UE when an AS timer in the base station expires. The processor allocates the downlink resource to the target UE according to the second resource indicator, and the transceiver sends the second data packet on the downlink resource, and when a ready timer in the core network device does not expire, the second data packet is sent by the core network device to the base station, and when the AS timer in the base station does not expire, the transceiver is further configured to send second DCI to the target UE, where the second DCI includes a third resource indicator corresponding to a fourth identifier of the target UE such that the target UE obtains the third resource indicator according to the fourth identifier of the target UE after receiving the second DCI, and the fourth identifier is an identifier used for scheduling a resource when the target UE is in the air-interface connected mode, and the fourth identifier and the second identifier are identifiers of one type.

With reference to the second possible implementation of the fourth aspect of the embodiments of the present disclosure, in a fourth possible implementation of the fourth aspect of the embodiments of the present disclosure, the transceiver is further configured to send the first DCI to the target UE when paging request signaling sent by the core network device is received, and an AS timer in the base station expires, and the processor allocates the uplink resource to the target UE according to the second resource indicator such that the target UE sends the third data packet on the uplink resource, where the third data packet is a paging response message sent by the target UE to the core network device, and the first data packet is a paging message sent by the base station at a preset time.

With reference to the fourth aspect, or the first possible implementation of the fourth aspect of the embodiments of the present disclosure, in a fifth possible implementation of the fourth aspect of the embodiments of the present disclosure, the first identifier of the target UE is a P-RNTI identifier of the target UE, and the P-RNTI identifier is calculated by the base station and the UE according to a preset rule. The second identifier of the target UE is a C-RNTI identifier of the target UE, and the C-RNTI identifier is allocated by the base station to the UE, and the third identifier of the target UE is a TLLI or an IMSI of the target UE.

With reference to the fourth aspect of the embodiments of the present disclosure, in a sixth possible implementation of the fourth aspect of the embodiments of the present disclosure, the first identifier of the target UE is a TLLI of the target UE.

A fifth aspect of the embodiments of the present disclosure provides UE, including a receiver, a processor, and a transmitter, where the receiver is configured to listen, at a preset time, to first DCI sent by a base station when the UE is in an air-interface idle mode. The processor is configured to obtain a first resource indicator corresponding to the first identifier if the first DCI includes scheduling information corresponding to a first identifier of the UE, where the first identifier is an identifier used by the base station for scheduling the target UE when the target UE is in the air-interface idle mode, the first resource indicator is used to indicate a resource used by the target UE during resource scheduling, and the resource includes a downlink resource, and the receiver is further configured to receive, on the downlink resource, a first data packet sent by the base station.

With reference to the fifth aspect of the embodiments of the present disclosure, in a first possible implementation of the fifth aspect of the embodiments of the present disclosure, the first identifier is an identifier of a preset type. The processor is further configured to search the first data packet for a correspondence between a second identifier and a third identifier of the UE after the receiver receives, on the downlink resource, the first data packet sent by the base station. The second identifier is an identifier that is newly allocated by the base station to the UE in the air-interface idle mode and that is used for entering an air-interface connected mode by the UE. The third identifier is used to identify the UE between the UE and a core network device, and if the correspondence between the second identifier and the third identifier of the UE is obtained by searching the first data packet, the processor is further configured to obtain the second identifier according to the third identifier of the UE, and receive scheduling information and user data using the second identifier as identification information used in the air-interface connected mode.

With reference to the first possible implementation of the fifth aspect of the embodiments of the present disclosure, in a second possible implementation of the fifth aspect of the embodiments of the present disclosure, the processor is further configured to search the first DCI for a second resource indicator corresponding to the second identifier, and if the first DCI includes the second resource indicator corresponding to the second identifier, the receiver is further configured to receive, according to a downlink resource indicated by the second resource indicator, a second data packet sent by the base station, or the transmitter is configured to send a third data packet according to an uplink resource indicated by the second resource indicator, or if the first DCI does not include the second resource indicator corresponding to the second identifier, the receiver continues to listen to subsequent DCI to determine whether the base station schedules the UE.

With reference to the second possible implementation of the fifth aspect of the embodiments of the present disclosure, in a third possible implementation of the fifth aspect of the embodiments of the present disclosure, when the transmitter sends the third data packet according to the uplink resource indicated by the second resource indicator, the third data packet is a paging response message sent by the UE to the core network device, and the first data packet is a paging message sent by the base station at a preset time.

With reference to any one of the fifth aspect, the first possible implementation of the fifth aspect, the second possible implementation of the fifth aspect, or the third possible implementation of the fifth aspect of the embodiments of the present disclosure, in a fourth possible implementation of the fifth aspect of the embodiments of the present disclosure, the first identifier of the UE is a P-RNTI identifier of the UE, and the P-RNTI identifier is calculated by the base station and the UE according to a preset rule. The second identifier of the UE is a C-RNTI identifier of the UE, and the C-RNTI identifier is allocated by the base station to the UE, and the third identifier of the UE is a TLLI or an IMSI of the UE.

With reference to the fifth aspect of the embodiments of the present disclosure, in a fifth possible implementation of the fifth aspect of the embodiments of the present disclosure, the first identifier of the UE is a TLLI of the UE.

A sixth aspect of the embodiments of the present disclosure provides a base station, including a receiver, a processor, and a transmitter, where the receiver is configured to receive a paging instruction sent by a core network device, where the paging instruction includes a third identifier of target UE, and the third identifier is used to identify the target UE between UE and the core network device. The processor is configured to search a preset mapping relationship table according to the third identifier, where the mapping relationship table includes a one-to-one correspondence between a third identifier of the UE and a fourth identifier of the UE, and if there is the third identifier of the target UE in the mapping relationship table, the transmitter responds to the paging instruction of the core network device such that the core network device sends, to the base station, a downlink data packet that needs to be sent to the target UE, where the fourth identifier is used for scheduling a resource when the target UE is in an air-interface connected mode. The receiver is further configured to receive the downlink data packet sent by the core network device. The processor is further configured to obtain a fourth identifier of the target UE by searching the mapping relationship table according to the third identifier of the target UE, and the processor is further configured to schedule a resource according to the fourth identifier of the target UE, and send the downlink data packet to the target UE.

With reference to the sixth aspect of the embodiments of the present disclosure, in a first possible implementation of the sixth aspect of the embodiments of the present disclosure, the transmitter is further configured to send DCI to the target UE, where the DCI includes a resource indicator corresponding to the fourth identifier, the resource indicator is used to indicate a resource used by the target UE during resource scheduling, and the resource includes a downlink resource, and the transmitter is further configured to send the downlink data packet to the target UE using the downlink resource.

With reference to the sixth aspect, or the first possible implementation of the sixth aspect of the embodiments of the present disclosure, in a second possible implementation of the sixth aspect of the embodiments of the present disclosure, the third identifier of the UE is a TLLI or an IMSI of the UE, and the fourth identifier of the UE is a C-RNTI identifier of the UE, and the C-RNTI identifier is allocated by the base station to the UE.

With reference to the second possible implementation of the sixth aspect of the embodiments of the present disclosure, in a third possible implementation of the sixth aspect of the embodiments of the present disclosure, the paging instruction sent by the core network device includes a TLLI of the target UE.

It may be learned from the foregoing technical solutions that the embodiments of the present disclosure have the following advantages.

In the embodiments of the present disclosure, in one aspect, when UE is in an air-interface idle mode, a base station sends first DCI to the UE in the air-interface idle mode in a serving cell of the base station. The first DCI includes a first resource indicator corresponding to a first identifier of target UE. Because the first identifier is used to identify, during resource scheduling, the target UE that is in the air-interface idle mode and that is scheduled by the base station, resource scheduling is performed on the target UE in the air-interface idle mode using the first identifier. This effectively avoids a problem in MTC that when UE is in an air-interface idle mode, a base station cannot schedule the UE and send a corresponding downlink data packet. In another aspect, when a ready timer maintained between a base station and a core network device expires, a mapping relationship table that is between a third identifier of UE and a fourth identifier of the UE and that is preset in the base station is used, and when the base station receives a paging instruction that includes a third identifier in the corresponding table, the base station responds to the paging instruction, then receives downlink data that the core network device needs to send to target UE, obtains a fourth identifier of the target UE based on a correspondence between the third identifier and the fourth identifier, schedules a resource according to the fourth identifier of the target UE, and sends the downlink data packet to the target UE. This effectively avoids a problem in MTC that when a ready timer maintained between a base station and a core network device expires, downlink data that the core network device needs to send to target UE cannot be sent to the target UE because the UE listens only to scheduling that is based on a C-RNTI identifier of the UE.

DESCRIPTION OF EMBODIMENTS

Figure 1:
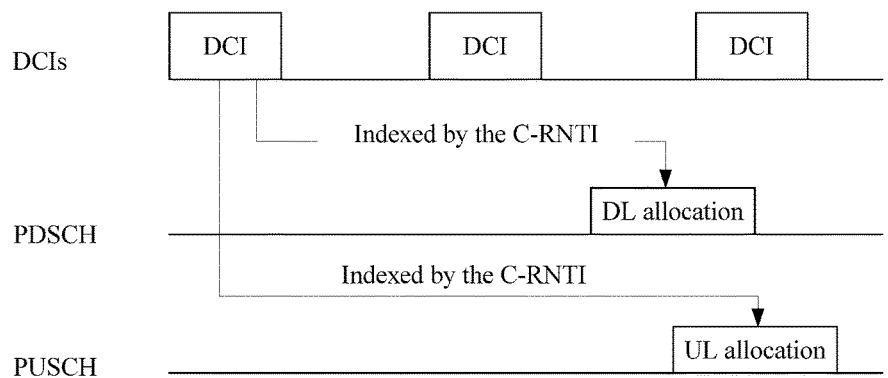
FIG. 1 is a schematic diagram of an embodiment of an MTC scheduling method according to the embodiments of the present disclosure.

Embodiments of the present disclosure provide an MTC scheduling method, a base station, and UE. On one hand, a problem that when UE is in an air-interface idle mode, a base station cannot schedule the UE and send a corresponding downlink data packet is avoided. On the other hand, a problem that when a ready timer maintained between a base station and a core network device expires, downlink data that the core network device needs to send to target UE cannot be sent to the target UE because the UE listens only to scheduling that is based on a C-RNTI identifier of the UE is avoided.

To make persons skilled in the art understand the technical solutions in the present disclosure better, the following clearly describes the technical solutions in the embodiments of the present disclosure with reference to the accompanying drawings in the embodiments of the present disclosure. The described embodiments are merely some rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first," "second," and the like (if they exist) are intended to distinguish between similar objects but do not necessarily indicate a specific order. It should be understood that data termed in such a way is interchangeable in proper circumstances so that the embodiments of the present disclosure described herein can be implemented in other orders than the order illustrated or described herein. In addition, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

For ease of understanding of the embodiments of the present disclosure, some elements used in descriptions of the embodiments of the present disclosure are first described herein.

DCI is carried on a physical downlink control channel (PDCCH), and DCI sent by a base station to UE includes an uplink/downlink resource allocation, hybrid automatic repeat request (HARQ) information, power control, and the like.

An IMSI is an identifier for distinguishing between mobile subscribers and stored in a subscriber identity module (SIM) card, and may be used as effective information for distinguishing between mobile subscribers. The IMSI identity is a permanent identifier of UE.

A TLLI includes 4 bytes, that is, 32 bits, and the TLLI is allocated by a core network to UE.

A radio network temporary identifier (RNTI) is used as an identifier of UE in signal information between the UE and a base station, multiple types of RNTIs are classified according to different functions, and each UE may correspond to multiple RNTIs. Functions such as system broadcast and specific user scheduling are implemented by indexing or scrambling a PDCCH control message using the RNTI. The RNTI includes a C-RNTI used for scheduling a resource when UE is in an air-interface connected mode, a P-RNTI used by the UE in a paging process, and the like. The P-RNTI identifier is generated according to a TLLI or an IMSI of the UE and according to a preset rule.

A ready timer defines a time length in which UE enters a standby state from a ready state after packet transmission stops. The ready timer defines a time for which the user remains in a ready state, and the time applies both to the UE and a core network device. When the UE transmits a point-to-point packet data unit, a ready timer in the UE is reset and starts timing, and when the core network device receives a correct point-to-point packet data unit, a ready timer in the core network device is also reset and starts timing.

There is a ready timer in both UE and a core network device, and the timer controls the UE whether to execute a cell update process. On a UE side, the timer needs to be started each time the UE in a ready state sends a point-to-point packet data unit to a network. If after the timer expires, the UE does not send a next packet data unit to reset the timer, the UE enters a standby state, and the ready timer normally stops. After the ready timer expires, the UE does not need to execute a cell update process at a cell level, and updates, using a routing area update procedure, a new routing area to the core network device only when a routing area is crossed. In the core network device, the timer needs to be started each time the network receives a point-to-point packet data unit, and if after the timer expires, the core network device does not receive a next packet data unit to reset the timer, and therefore, the timer expires, the network enters a standby state. After the ready timer expires, if the core network device needs to send new downlink data to the UE, the core network device can only initiate paging to the UE within a routing area range according to a policy, and forward the corresponding downlink data to a corresponding base station only after the UE responds. The ready timer has a same value in the UE and the core network device (for example, a serving GPRS support node (SGSN)), and the time value is an optional value. Whether the time value is sent is set in the core network device, and if the time value is set, the UE is notified of this value using an attach accept message and a routing area update accept message that are sent by the core network device.

An AS timer is a timer that is maintained between a terminal and a base station and that is used to control an air interface mode. After the air-interface mode timer expires, it is considered that an air interface of the UE is in an idle mode, and the base station releases a connected-mode identifier (for example, a C-RNTI) of the terminal. When the air interface of the UE is in a connected mode, the UE listens to corresponding scheduling signaling only according to a connected-mode identifier of the UE.

Generally, an air interface has two modes, a connected mode and an idle mode. When an air interface of UE is in the connected mode, a base station may schedule the UE directly using a connected-mode identifier (for example, a C-RNTI). When the air interface of the UE is in the idle mode, the UE usually listens only to a paging packet, and therefore, the UE cannot be scheduled using a C-RNTI identifier. In this case, the UE may be scheduled using a P-RNTI identifier.

MTC has special requirements. For example, currently, MTC based on an existing cellular network infrastructure that is generally referred to as Cellular MTC mainly has the following requirements on a network and UE.

Wide coverage requirement: An MTC service generally does not require a quite high service rate, but requires that quite large coverage can be supported. This further means that an MTC base station needs to have a relatively strong coverage enhancement technology, and can provide a communication service for UE with a relatively large penetration loss (i.e., 20 decibels (dB)). For example, UE in a smart meter-reading service such as a smart water/electricity meter is usually installed indoors or even in a basement, and an existing cellular network technology has a difficulty in providing a reliable communication service for devices on these locations.

Large connection quantity: For one MTC base station, there may be a large amount of (over tens of thousands of) Internet of Things (IoT) terminal devices such as smart water/electricity meters, smart home devices, vehicles, and wearable devices that are massively deployed, and how to provide connection services for multiple UEs at a same moment and prevent network congestion is a problem that needs to be resolved.

Cost-effectiveness: A cost of UE is lower than that of existing UE, and cost-effectiveness is a necessary condition for massive deployment of MTC devices.

Low power consumption: Low power consumption of UE is required, and lower power consumption means that MTC UE has a longer standby time and human costs of battery change are reduced.

In a CIoT system discussed in current 3GPP, a typical scheduling mechanism is shown in FIG. 1. For UE in an air-interface connected mode, DCI is sent, a downlink allocation (DL allocation) entry in the DCI is indexed according to an allocated C-RNTI of the UE in the DCI to allocate a physical downlink shared channel (PDSCH) resource, and an uplink allocation (UL allocation) is indexed according to the allocated C-RNTI identifier of the UE in the DCI to allocate a physical uplink shared channel (PUSCH) resource such that the UE is scheduled.

Further, structure composition of each piece of DCI is shown in the following Table 1.

TABLE 1

| Field | Description |
| --- | --- |
| Bitmap ACK | $1^{st}$ transmission of bitmap acknowledgement (ACK) |
| Bitmap ACK Repeat | $2^{nd}$ transmission of bitmap ACK |
| Allocation Lengths | DL, UL and random access channel (RACH) array allocation lengths (4 bits spare) |

TABLE 1-continued

| Field | Description |
| --- | --- |
| DL Allocation | DL allocation |
| UL Allocation | UL allocation |
| RACH Allocation | RACH allocation |
| CRC | Cyclic redundancy check (CRC) of complete packet |
| Overheads Total | Size of DCI without any allocations |

A structure of a DL allocation is shown in the following Table 2.

TABLE 2

| Field | Description |
| --- | --- |
| RNTI | C-RNTI, P-RNTI, or random access-RNTI (RA-RNTI) structure |
| Channel ID | Channel allocation is on (0..15) |
| MCS | Modulation and coding scheme (MCS) for the allocation |
| Start Indicator | Time when allocation starts |
| Duration | Cell broadcast service (CBS) of the allocation |
| DLPN | Protocol data unit (PDU) number in the allocation |
| Total | Number of bits per allocation |

It may be learned from Table 1 and Table 2 that in the foregoing examples, each DL allocation is actually one list in DCI, and each entry is indexed using an RNTI identifier, that is, each entry corresponds to an RNTI identifier.

As analyzed above, an S 1-based architecture and a Gb-based architecture need to be compatible as much as possible in a new CIoT access network design. Therefore, discontinuous reception in a connected mode also needs to be supported in a new Cellular MTC access network design. Further, in the new access network design, a ready timer that controls a core network device to send data to a base station is maintained between the core network device and UE, and an AS timer that controls an air interface mode is maintained between the base station and the UE. Functions of the ready timer herein are similar to those of the foregoing ready timer, and functions of the AS timer are similar to those of the foregoing AS timer.

Because a time for sending an MTC service is usually quite long, a time for sending by UE on an air interface is quite long. In this case, a case in which a ready timer does not expire, but an AS timer expires exists, and a case in which a ready timer expires, but an AS timer does not expire also exists. In the two cases, a core network device cannot normally send a downlink data packet to the UE. Details are as follows.

Case (1): The AS timer expires, but the ready timer does not expire: In a case, the ready timer does not expire, and in this case, the core network device directly sends the downlink data to a base station. However, in this case, because the AS timer between the base station and the terminal has expired, an air interface of the UE has been released, the UE is in an air-interface idle mode, and the base station cannot directly schedule the UE and send the corresponding downlink data packet.

Case (2): The AS timer does not expire, but the ready timer expires: In another case, the ready timer expires, but the AS timer does not expire. Because the ready timer expires, when the core network device needs to send the downlink data to the UE, the core network device does not directly forward the data to a corresponding base station. Instead, the core network device sends a paging request, and the base station sends a paging message. Because the AS timer does not expire, the UE is still in a connected mode, the UE listens only to scheduling that is based on a C-RNTI of the UE, and the downlink data cannot be sent to the UE using the base station.

Case (3): Both the AS timer and the ready timer expire: Because both the AS timer and the ready timer expire, the core network device can only enable, in a paging manner, the UE to enter a connected mode, and then send the downlink data packet to the UE. A specific process is that after receiving paging, the UE needs to re-establish an air interface with a base station using an RACH process. Because the UE is in relatively poor coverage, a quite long sending and receiving time may be consumed to send an RACH in an uplink manner to complete an RACH-based conflict resolution process. This severely affects a battery lifespan of an MTC terminal.

Figure 2:
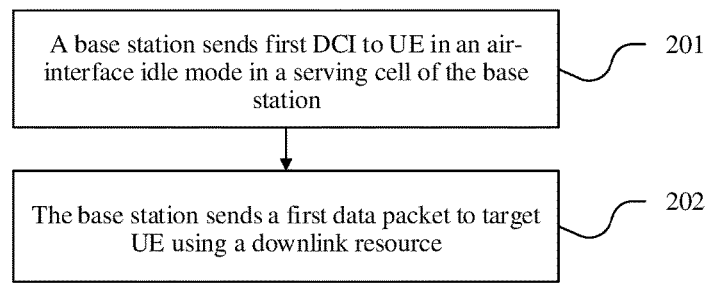
FIG. 2 is a schematic diagram of another embodiment of an MTC scheduling method according to the embodiments of the present disclosure.

Based on the foregoing cases, the embodiments of the present disclosure provide an MTC scheduling method, a base station, and UE. The following first describes an embodiment of an MTC scheduling method in the embodiments of the present disclosure. Referring to FIG. 2, The MTC scheduling method provided in this embodiment of the present disclosure may include the following content.

Step 201: A base station sends first DCI to UE in an air-interface idle mode in a serving cell of the base station.

The first DCI includes a first resource indicator corresponding to a first identifier of target UE, the first identifier is an identifier used by the base station for scheduling the target UE when the target UE is in the air-interface idle mode, the first resource indicator is used to indicate a resource used by the target UE during resource scheduling, and the resource includes a downlink resource. The target UE may be UE that is in the UE in the air-interface idle mode and for which the base station is to perform resource scheduling.

Step 202: The base station sends a first data packet to the target UE using the downlink resource.

In this embodiment, the base station sends the first data packet to the target UE using the downlink resource such that when being in the air-interface idle mode, the target UE can listen, based on the first identifier, to DCI that is sent by a base station of a serving cell to which the target UE belongs, and obtain the first resource indicator corresponding to the first identifier when receiving the first DCI that includes the first resource indicator corresponding to the first identifier.

In this embodiment, a base station sends first DCI to UE in an air-interface idle mode in a cell, and the first DCI includes a first resource indicator corresponding to a first identifier of the target UE. The first identifier is used for scheduling a resource when the target UE is in the air-interface idle mode. Therefore, this effectively avoids a problem in MTC that when UE is in an air-interface idle mode, a base station cannot schedule the UE and send a corresponding downlink data packet.

Optionally, in the embodiment shown in FIG. 1, the first identifier is an identifier of a preset type, for example, may be a P-RNTI identifier of the target UE. The identifier of the preset type may be calculated according to a preset rule, for example, the P-RNTI identifier is calculated using a TLLI or an IMSI of the target UE.

Alternatively, the identifier of the preset type may be preset. The first data packet includes a correspondence between a second identifier and a third identifier of the target UE such that the target UE obtains the second identifier according to the third identifier of the target UE after receiving the first data packet.

The second identifier is an identifier that is newly allocated by the base station to the target UE in the air-interface idle mode and that is used for entering an air-interface connected mode by the target UE.

The third identifier is used to identify the target UE between the target UE and a core network device.

In this case, when the first identifier is an identifier of a preset type, the base station sends the first DCI to the UE in the air-interface idle mode in the serving cell corresponding to the base station such that when being in the idle mode, the target UE can listen, based on the first identifier, to the DCI that is sent by the base station of the serving cell to which the target UE belongs, and when receiving the first DCI that includes the first resource indicator corresponding to the first identifier, obtain the first resource indicator corresponding to the first identifier, receive the first data packet according to a resource indicated by the first resource indicator, and search the first data packet for a correspondence between a second identifier and a third identifier of the UE. If the target UE obtains the correspondence between the second identifier and the third identifier of the UE by searching the first data packet, the target UE obtains the second identifier according to the third identifier of the target UE, and receives scheduling information and user data using the second identifier as identification information used in the air-interface connected mode.

Optionally, in this embodiment of the present disclosure, a first identifier of the UE may be a P-RNTI identifier of the UE, and the P-RNTI identifier is calculated by the base station and the UE according to a preset rule. The second identifier of the UE may be a C-RNTI identifier of the UE, and the C-RNTI identifier is allocated by the base station to the UE, and the third identifier of the UE may be a TLLI or an IMSI of the UE, the TLLI is allocated by a core network to the UE, and the IMSI is a permanent identifier of the UE.

In this case, the first data packet is a downlink data packet for P-RNTI identifier-based scheduling, and the first data packet is a correspondence between the TLLI (or the IMSI) and a newly allocated C-RNTI identifier of the scheduled target UE.

Optionally, the first DCI may further include a second resource indicator corresponding to the second identifier, and the base station allocates a downlink resource to the target UE according to the second resource indicator, and the base station sends a second data packet on the downlink resource, or the base station allocates an uplink resource to the target UE according to the second resource indicator such that the target UE sends a third data packet on the uplink resource.

In this case, the first DCI includes the second resource indicator corresponding to the second identifier such that after receiving the second DCI, the target UE searches the first DCI for the second resource indicator corresponding to the second identifier.

If the first DCI includes the second resource indicator corresponding to the second identifier, the target UE receives, according to the downlink resource indicated by the second resource indicator, the second data packet sent by the base station, or sends the third data packet according to the uplink resource indicated by the second resource indicator, and the target UE continues to listen to subsequent DCI to determine whether the base station schedules the target UE if the first DCI does not include the second resource indicator corresponding to the second identifier.

For example, when the first identifier is a P-RNTI identifier, the second identifier is a C-RNTI identifier newly allocated by the base station to the UE, and the third identifier is a TLLI, the first data packet is a data packet for P-RNTI identifier-based scheduling, the data packet includes a correspondence between the newly allocated C-RNTI identifier of the target UE and the TLLI of the target UE, and the second resource indicator corresponds to the newly allocated C-RNTI, and is used to instruct the target UE to perform downlink receiving or uplink sending.

Optionally, that a base station sends first DCI to UE in an air-interface idle mode in a serving cell of the base station includes sending, by the base station, the first DCI to the target UE when an AS timer in the base station expires, and in this case, allocating, by the base station, the downlink resource to the target UE according to the second resource indicator, and sending, by the base station, the second data packet on the downlink resource, where when a ready timer in the core network device does not expire, the second data packet is sent by the core network device to the base station, and when the AS timer in the base station does not expire, the method further includes sending, by the base station, second DCI to the target UE, where the second DCI includes a third resource indicator corresponding to a fourth identifier of the target UE such that the target UE obtains the third resource indicator according to the fourth identifier of the target UE after receiving the second DCI.

The fourth identifier is an identifier used for scheduling a resource when the target UE is in the air-interface connected mode, and the fourth identifier and the second identifier are identifiers of one type, for example, are radio network temporary identifiers of one type, such as, C-RNTI identifiers.

In this case, when the AS timer in the base station does not expire, the base station may perform normal resource scheduling for the target UE, that is, send the second DCI. When the AS timer in the base station expires, the base station performs resource scheduling by sending the first DCI. Further, for example, when the first identifier is a P-RNTI identifier, the second identifier is a C-RNTI identifier newly allocated by the base station to the UE, and the third identifier is a TLLI, when the AS timer in the base station does not expire, the target UE is in the air-interface connected mode, the target UE has the allocated fourth identifier (for example, an allocated C-RNTI identifier), and the base station may perform resource scheduling based on the allocated C-RNTI identifier of the target UE.

When the AS timer in the base station expires, the target UE is in the air-interface idle mode, and the allocated C-RNTI of the target UE has been released. In this case, the base station sends the first DCI to the UE in the serving cell corresponding to the base station. The first DCI includes a P-RNTI identifier, and the P-RNTI identifier is separately calculated by the base station and the target UE according to a preset rule. The base station searches, according to the P-RNTI identifier, for a first resource indicator corresponding to the P-RNTI identifier, and sends the first data packet to the target UE according to the first resource indicator. The first data packet includes a correspondence between the TLLI identifier and the newly allocated C-RNTI identifier of the target UE. Therefore, after receiving the first data packet, the target UE may obtain, according to the TLLI identifier of the target UE, the new C-RNTI identifier allocated by the base station to the target UE. If the first DCI further includes a second resource indicator corresponding to the newly allocated C-RNTI, the target UE may obtain the second resource indicator according to the obtained new C-RNTI identifier, and the target UE may receive a second data packet on an uplink resource indicated by the second resource indicator.

Optionally, in this case, the target UE enters the air-interface connected mode according to the new C-RNTI identifier.

Optionally, that a base station sends first DCI to UE in an air-interface idle mode in a serving cell of the base station may include sending the first DCI to the target UE when the base station receives paging request signaling sent by the core network device, and an AS timer in the base station expires, and in this case, allocating, by the base station, the uplink resource to the target UE according to the second resource indicator such that the target UE sends the third data packet on the uplink resource, where the third data packet is a paging response message sent by the UE to the core network device, and the first data packet is a paging message sent by the base station at a preset time.

It should be noted that the base station may allocate both the uplink resource and the downlink resource to the target UE according to the second resource indicator such that the target UE receives the second data packet on the downlink resource, and sends the third data packet on the uplink resource.

In this case, the second data packet may be a paging message that is sent by the base station to the target UE after the base station receives the paging request signaling sent by the core network device, and the third data packet may be paging response signaling sent by the UE to the core network device such that the base station learns that the target UE is in the serving cell corresponding to the base station.

The following describes, with reference to a specific embodiment, a specific case in which when the first DCI further includes the second resource indicator corresponding to the second identifier, the base station allocates the downlink resource to the target UE according to the second resource indicator, and the base station sends the second data packet on the downlink resource, or the base station allocates the uplink resource to the target UE according to the second resource indicator such that the target UE sends the third data packet on the uplink resource.

Figure 3:
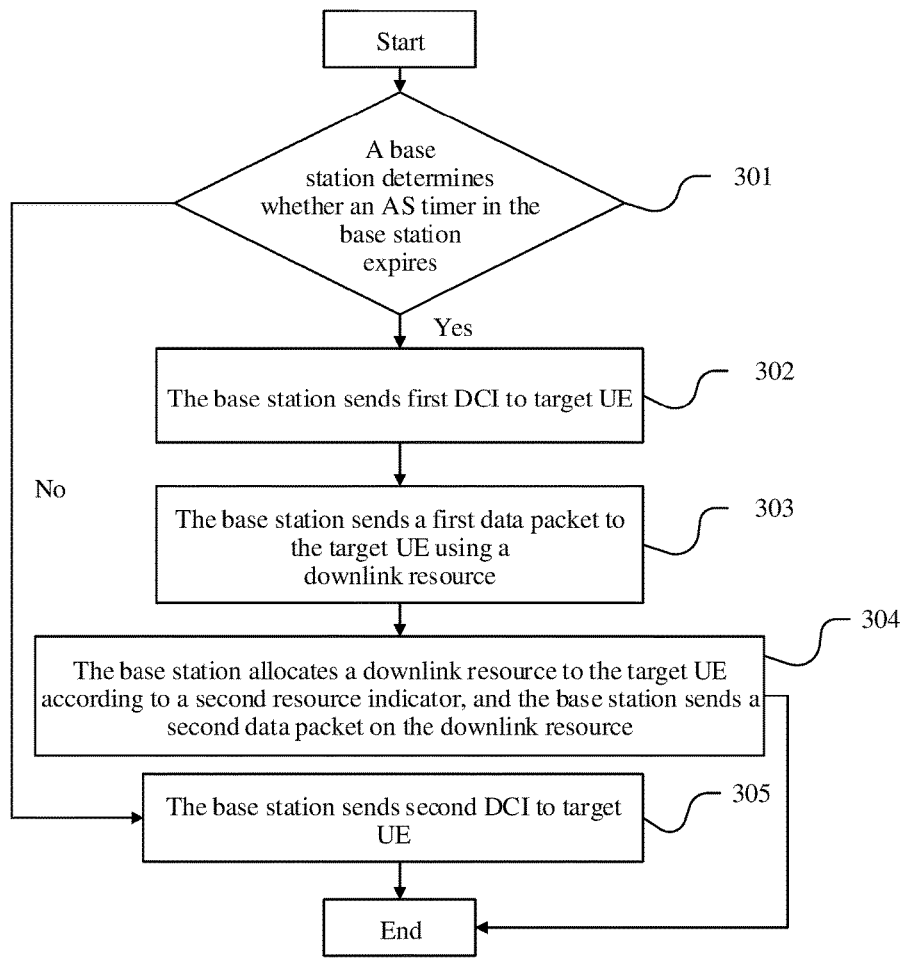
FIG. 3 is a schematic diagram of another embodiment of an MTC scheduling method according to the embodiments of the present disclosure.

Referring to FIG. 3, another MTC scheduling method provided in the present disclosure may include the following content.

Step 301: A base station determines whether an AS timer in the base station expires, and if the AS timer expires, performs step 302, or if the AS timer does not expire, performs step 305.

Step 302: The base station sends the first DCI to the target UE.

The first DCI includes a first resource indicator corresponding to a first identifier of the target UE, the first resource indicator is used to indicate a resource used by the target UE during resource scheduling, and the resource includes a downlink resource. The first identifier is an identifier used by the base station for scheduling the target UE when the target UE is in an air-interface idle mode. For example, the first identifier may be a radio network identifier of the target UE. The first identifier is different from an identifier (for example, a C-RNTI identifier) for scheduling a resource when the target UE is in a connected mode.

In this embodiment, the first identifier is an identifier of a preset type as described above, the first DCI further includes a second resource indicator corresponding to a second identifier, and the second identifier is an identifier that is newly allocated by the base station to the target UE in the air-interface idle mode and that is used for entering the air-interface connected mode by the target UE.

Step 303: The base station sends a first data packet to the target UE using the downlink resource.

In this embodiment, the downlink resource is a downlink resource indicated by the first resource indicator in the first DCI, and the first data packet includes a correspondence between a third identifier and a second identifier of the target UE such that the target UE obtains the second identifier according to the third identifier of the target UE after receiving the first data packet.

The third identifier is used to identify the target UE between the target UE and a core network device.

In this embodiment, the base station sends the first data packet to the target UE according to the first resource indicator such that when being in the air-interface idle mode, the target UE can listen, based on the first identifier, to DCI that is sent by a base station of a serving cell to which the target UE belongs, and when receiving the first DCI that includes the first identifier, obtain the first resource indicator corresponding to the first identifier, receive the first data packet, obtain, according to the third identifier of the target UE, the second identifier newly allocated by the base station to a UE, and obtain, from the first DCI according to the second identifier, the second resource indicator corresponding to the second identifier.

Step 304: The base station allocates a downlink resource to the target UE according to the second resource indicator, and the base station sends a second data packet on the downlink resource.

In this embodiment, when a ready timer in the core network device does not expire, the second data packet is sent by the core network device to the base station.

Step 305: The base station sends second DCI to the target UE.

The second DCI includes an allocated fourth identifier of the target UE and a third resource indicator corresponding to the fourth identifier such that the target UE obtains the third resource indicator according to the fourth identifier of the target UE after receiving the second DCI. The fourth identifier is an identifier used for scheduling a resource when the target UE is in the air-interface connected mode, and the fourth identifier and the second identifier are identifiers of one type, for example, are radio network temporary identifiers of one type, such as, C-RNTI identifiers.

In this embodiment, a base station sends first DCI to UE in an air-interface idle mode in a serving cell corresponding to the base station, and the first DCI includes a first resource indicator corresponding to a first identifier of the target UE. The base station schedules a data packet using the first identifier to allocate a new second identifier to the UE for scheduling a resource when the UE is in the idle mode. This effectively avoids a problem in MTC that when UE is in an air-interface idle mode, a base station cannot schedule the UE and send a corresponding downlink data packet.

It may be understood that, in addition to the embodiment shown in FIG. 3, in the embodiment shown in FIG. 1, that a base station sends first DCI to UE in an air-interface idle mode in a serving cell of the base station may include that when the base station receives paging request signaling sent by the core network device, and the AS timer in the base station expires, sending the first DCI to the target UE, and in this case, allocating, by the base station, the uplink resource to the target UE according to the second resource indicator such that the target UE sends the third data packet on the uplink resource. The third data packet is a paging response message sent by the target UE to the core network device, and the first data packet is a paging message sent by the base station at a preset time. The following provides descriptions with reference to a specific embodiment.

Figure 4:
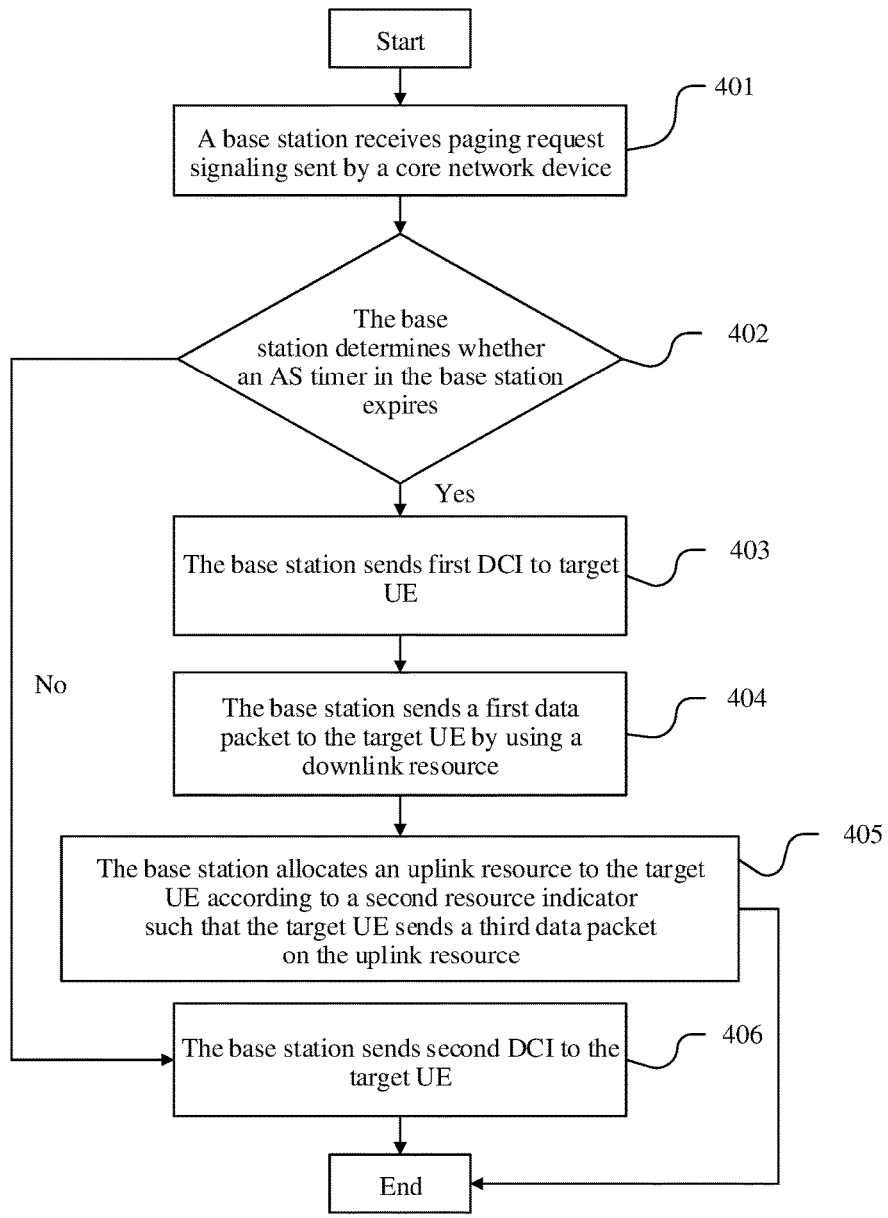
FIG. 4 is a schematic diagram of another embodiment of an MTC scheduling method according to the embodiments of the present disclosure.

Referring to FIG. 4, another MTC scheduling method provided in the present disclosure may include the following content.

Step 401: A base station receives paging request signaling sent by a core network device.

When being in an idle mode for a long time, UE does not always notify the core network device of a cell location of the UE. Therefore, the core network device only knows that the UE falls within a specific range (routing area). In this case, the core network device first initiates paging requests to base stations of all cells within the routing area routing area using the paging request such that the base station sends a paging message paging message at a preset time paging occasion, and target UE responds after receiving the paging message.

The preset time paging occasion is calculated in different manners in different communications systems. For example, in a narrowband (NB) M2M communication system, the paging occasion may be calculated in the following manner. The paging occasion may be determined using a hyper frame number corresponding to the paging occasion and an index in a corresponding super frame. The corresponding super frame may be calculated according to the following formula:

$$\text{SFN mod } T = (T \text{ div } N)*(\text{UE\_ID mod } N).$$

A number of the paging occasion in the super frame may be:

$$i\_s = \text{floor (UE\_ID}/N) \text{ mod } Ns,$$

where T is a cycle length of a paging Discontinuous Reception (DRX) cycle, N is used to group super frames, and N may be typically {T, T/2, T/4, T/8}, Ns represents a total amount of DCI that may be carried in one super frame, and Ns=64/DCI interval, and UE_ID is an IMSI or a TLLI of UE.

Step 402: The base station determines whether an AS timer in the base station expires, and if the AS timer expires, performs step 403, or if the AS timer does not expire, performs step 406.

Step 403: The base station sends first DCI to target UE.

The first DCI includes a first resource indicator corresponding to a first identifier of the target UE, the first resource indicator is used to indicate a resource used by the target UE during resource scheduling, and the resource includes a downlink resource. The first identifier is an identifier used by the base station for scheduling the target UE when the target UE is in the air-interface idle mode, and the first identifier may be a radio network identifier of the target UE.

The first identifier is different from an identifier (for example, a C-RNTI identifier) for scheduling a resource when the target UE is in a connected mode.

The first identifier is an identifier of a preset type as described above, the first DCI further includes a second resource indicator corresponding to a second identifier, and the second identifier is an identifier that is newly allocated by the base station to the target UE in the air-interface idle mode and that is used for entering the air-interface connected mode by the target UE.

Step 404: The base station sends a first data packet to the target UE using the downlink resource.

In this embodiment, the first data packet is a paging message sent by the base station at a preset time. The first data packet includes a correspondence between a third identifier and the second identifier of the target UE such that after receiving the first data packet, the target UE obtains the second identifier according to the third identifier of the target UE, and enters the air-interface connected mode according to the second identifier.

The second identifier is an identifier that is newly allocated by the base station to the target UE in the air-interface idle mode and that is used for entering the air-interface connected mode by the target UE, and the third identifier is used to identify the UE between the target UE and the core network device.

In this embodiment, the base station sends the first data packet to the target UE according to the first resource indicator such that when being in the idle mode, the target UE can listen, based on the first identifier, to DCI that is sent by a base station of a serving cell to which the target UE belongs, and when receiving the first DCI that includes the first resource indicator corresponding to the first identifier, obtain the first resource indicator corresponding to the first identifier, receive the first data packet, obtain, according to the third identifier of the target UE, the second identifier newly allocated by the base station to a UE, and obtain, from the first DCI according to the second identifier, the second resource indicator corresponding to the second identifier.

Step 405: The base station allocates an uplink resource to the target UE according to the second resource indicator such that the target UE sends a third data packet on the uplink resource.

The third data packet is a paging response message sent by the target UE to the core network device.

After receiving paging response signaling, the base station may determine that the target UE is in a serving cell corresponding to the base station. In this case, the base station may send a downlink data packet to the UE.

Step 406: The base station sends second DCI to the target UE.

The second DCI includes an allocated fourth identifier of the target UE and a third resource indicator corresponding to the fourth identifier such that the target UE obtains the third resource indicator according to the fourth identifier of the target UE after receiving the second DCI. The fourth identifier is an identifier used for scheduling a resource when the target UE is in the air-interface connected mode, and the fourth identifier and the second identifier are identifiers of one type, for example, C-RNTI identifiers.

Figure 5:
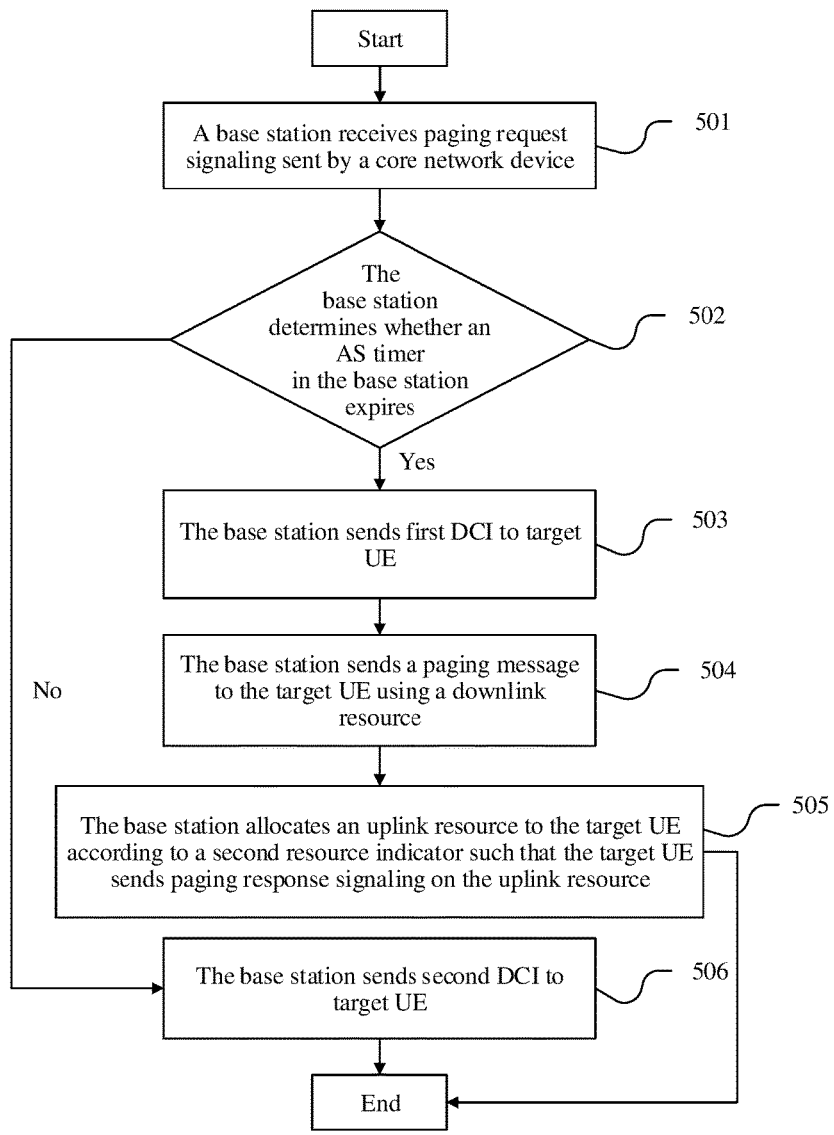
FIG. 5 is a schematic diagram of another embodiment of an MTC scheduling method according to the embodiments of the present disclosure.

The following provides descriptions with reference to a specific application scenario embodiment. Referring to FIG. 5, an embodiment of another MTC scheduling method provided in the embodiments of the present disclosure includes the following steps.

Step 501: A base station receives paging request signaling sent by a core network device.

In this step, a case in which the base station receives the paging request signaling sent by the core network device is similar to that in step 401. Details are not described herein again.

Step 502: The base station determines whether an AS timer in the base station expires, and if the AS timer expires, performs step 503, or if the AS timer does not expire, performs step 506.

Step 503: The base station sends first DCI to the target UE.

The first DCI includes a first resource indicator corresponding to a P-RNTI identifier of the target UE, the first resource indicator is used to indicate a resource used by the target UE during resource scheduling, and the resource includes a downlink resource. The P-RNTI identifier is an identifier used by the base station for scheduling the target UE when the target UE is in an air-interface idle mode.

The first DCI further includes a second resource indicator corresponding to a C-RNTI identifier, and the base station allocates an uplink resource to the target UE according to the second resource indicator such that the target UE sends a third data packet on the uplink resource. The C-RNTI identifier is an identifier that is newly allocated by the base station to the target UE in the air-interface idle mode and that is used for entering an air-interface connected mode by the target UE.

Step 504: The base station sends a paging message to the target UE using the downlink resource.

In this embodiment, the paging message is a paging message sent by the base station at a preset time, and the paging message includes a correspondence between a TLLI and the newly allocated C-RNTI identifier of the target UE, and the TLLI is used to identify the UE between the target UE and the core network device.

In this embodiment, the base station sends a first data packet to the target UE according to the first resource indicator such that when being in the idle mode, the target UE can listen, based on the P-RNTI identifier to DCI that is sent by a base station of a cell, and when receiving the first DCI that includes the P-RNTI identifier of the target UE, obtain the first resource indicator corresponding to the P-RNTI identifier, receive the first data packet, obtain, according to the TLLI of the target UE, the C-RNTI identifier newly allocated by the base station to a UE, and obtain, from the first DCI according to the new C-RNTI identifier, the second resource indicator corresponding to the C-RNTI identifier.

Step 505: The base station allocates an uplink resource to the target UE according to the second resource indicator such that the target UE sends a paging response message on the uplink resource.

In this case, the foregoing third data packet is the paging response message, and the paging response message is sent by the target UE to the core network device.

After receiving paging response signaling, the base station may determine that the target UE is in a cell corresponding to the base station. In this case, the base station may send downlink data to the target UE.

Step 506: The base station sends second DCI to the target UE.

The second DCI includes an allocated fourth identifier of the target UE and a third resource indicator corresponding to the fourth identifier. The fourth identifier is an identifier used for scheduling a resource when the target UE is in the air-interface connected mode, and the fourth identifier and the second identifier are identifiers of one type.

When the AS timer in the base station does not expire, the target UE is in the air-interface connected mode, the target UE has an allocated C-RNTI identifier, and the base station may perform resource scheduling based on the allocated C-RNTI identifier of the target UE. Further, the base station sends the second DCI to the target UE, and the second DCI includes the allocated C-RNTI identifier and a third resource indicator corresponding to the allocated C-RNTI identifier such that the target UE obtains the second DCI and obtains the third resource indicator, according to the allocated C-RNTI identifier. The target UE may perform downlink receiving or uplink sending according to the third resource indicator.

Figure 6:
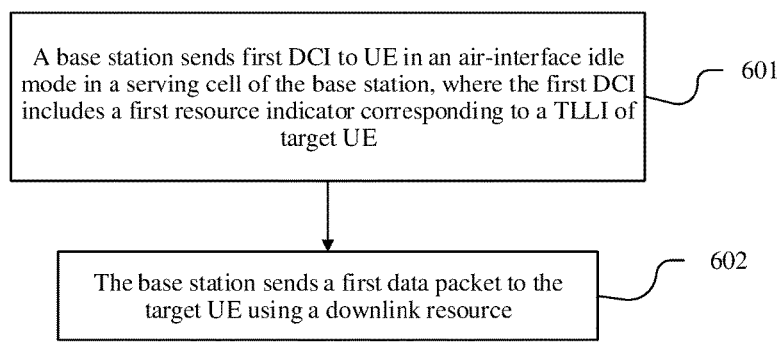
FIG. 6 is a schematic diagram of another embodiment of an MTC scheduling method according to the embodiments of the present disclosure.

In an existing DCI format, resource scheduling cannot be performed using a TLLI identifier of UE. Therefore, an embodiment of the present disclosure further provides a TLLI-based resource scheduling method, that is, the foregoing first identifier is a TLLI of UE. Further, referring to FIG. 6, an embodiment of another MTC scheduling method provided in the embodiments of the present disclosure includes the following steps.

Step 601: A base station sends first DCI to UE in an air-interface idle mode in a serving cell of the base station, where the first DCI includes a first resource indicator corresponding to a TLLI of the target UE, the first resource indicator is used to indicate a resource used by the target UE during resource scheduling, the resource includes a downlink resource, and in this case, the TLLI is an identifier used by the base station for scheduling the target UE when the target UE is in the air-interface idle mode.

In this embodiment, the TLLI is used to identify, during resource scheduling, the target UE that is in the air-interface idle mode and that is scheduled by the base station.

Step 602: The base station sends a first data packet to the target UE using the downlink resource.

In this embodiment, a structure of the first DCI is improved. The first DCI includes information indicating that the TLLI of the target UE is scheduled, that is, the TLLI of the target UE corresponds to the first resource indicator. The improved structure of the first DCI is shown in the following Table 3

TABLE 3

| Field | Description |
|---|---|
| Bitmap ACK | $1^{st}$ transmission of bitmap ACK |
| Bitmap ACK Repeat | $2^{nd}$ transmission of bitmap ACK |
| Allocation Lengths | DL, UL and RACH array allocation lengths (4 bits spare) |
| DL Allocation | DL allocation |
| UL Allocation | UL allocation |
| RACH Allocation | RACH allocation |
| DL TLLI based allocation | The allocation based on TLLI |
| UL TLLI based allocation | The allocation based on TLLI |
| CRC | CRC of complete packet |
| Overheads Total | Size of DCI without any allocations |

In Table 3, the first resource indicator in the first DCI includes a DL TLLI based allocation and a UL TLLI based allocation that are respectively a downlink resource corresponding to the TLLI of the UE and an uplink resource corresponding to the TLLI.

A specific structure of the DL TLLI based allocation is shown in the following Table 4.

TABLE 4

| Field | Length | Description |
|---|---|---|
| TLLI | 32 | TLLI of the scheduled UE |
| Channel ID | 4 | Channel allocation is on (0..15) |
| MCS | 4 | MCS for the allocation |
| Start Indicator | 4 | Time when allocation starts |
| Duration | 6 | CBS of the allocation |
| DLPN | 1 | PDU number in the allocation |
| Total | 39 | Number of bits per allocation |

A specific structure of the UL TLLI based allocation in Table 3 is shown in the following Table 5.

TABLE 5

| Field | Size | Description |
|---|---|---|
| TLLI | 32 | TLLI of the scheduled UE |
| Channel ID | 6 | Channel allocation is on |

TABLE 5-continued

| Field | Size | Description |
|---|---|---|
| MCS | 4 | MCS to use for allocation |
| Start Indicator | 4 | Start time of allocation |
| Duration | 6 | CBS for the allocation |
| ULPN | 1 | Uplink PDU number the UE must transmit |
| AckIndex | 4 | ACK/negative ACK (NACK) field index position |
| Total | 45 | Number of bits per allocation |

In this embodiment, on a base station side, resource scheduling is performed using a TLLI of UE in sent DCI such that when receiving and listening to the DCI, the UE needs to check whether the TLLI corresponding to the UE is scheduled, and if the UE is scheduled using the TLLI of the UE, the UE performs sending on a corresponding uplink resource or performs receiving on a corresponding downlink resource. This avoids a problem that resource scheduling cannot be performed when the UE is in an air-interface idle mode.

The MTC scheduling methods in the embodiments of the present disclosure are described above from a base station side. The following describes MTC scheduling methods in the embodiments of the present disclosure from a UE side.

Figure 7:
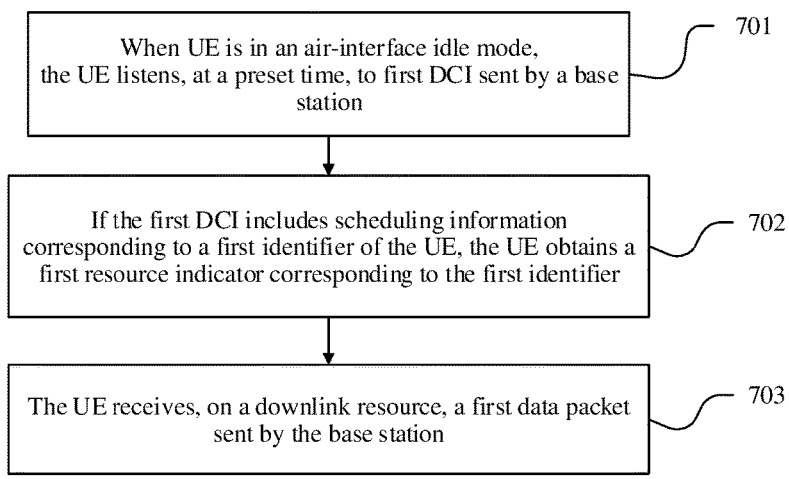
FIG. 7 is a schematic diagram of another embodiment of an MTC scheduling method according to the embodiments of the present disclosure.

Referring to FIG. 7, an embodiment of another MTC scheduling method provided in the embodiments of the present disclosure includes the following steps.

Step 701: When UE is in an air-interface idle mode, the UE listens, at a preset time, to first DCI sent by a base station.

Step 702: If the first DCI includes scheduling information corresponding to a first identifier of the UE, the UE obtains a first resource indicator corresponding to the first identifier.

The first identifier is an identifier used by the base station for scheduling the target UE when the target UE is in the air-interface idle mode, the first identifier may be a radio network identifier of the target UE, and the first identifier is different from an identifier (for example, a C-RNTI) for scheduling a resource when the target UE is in a connected mode, and may be a P-RNTI identifier or a TLLI of the UE. No limitation is set herein.

The first resource indicator is used to indicate a resource used by the target UE during resource scheduling, and the resource includes a downlink resource, and certainly, may also include an uplink resource.

Step 703: The UE receives, on the downlink resource, a first data packet sent by the base station.

In this embodiment of the present disclosure, UE in an air-interface idle mode may obtain, by means of listening according to a first identifier of the UE, first DCI that is sent by a base station and that includes the first identifier, obtain a first resource indicator corresponding to the first identifier from the first DCI, and receive, on a downlink resource indicated by the first resource indicator, a first data packet sent by the base station. In this embodiment of the present disclosure, resource scheduling is completed for the UE in the air-interface idle mode using the first identifier. This avoids a case in which the base station cannot schedule a resource in the air-interface idle mode.

It may be learned, from the embodiments of The MTC scheduling methods on a base station side, that the first data packet may include a correspondence between a third identifier and a second identifier of the UE.

Therefore, optionally, in this embodiment of the present disclosure, when the first identifier is an identifier of a preset type as described above, the first identifier is the same as a first identifier on the base station side. In this case, after the UE receives, on the resource indicated by the first resource indicator, the first data packet sent by the base station, the method may further include searching, by the UE, the first data packet for the correspondence between the second identifier and the third identifier of the UE, where the second identifier is an identifier that is newly allocated by the base station to the UE in the air-interface idle mode and that is used for entering the air-interface connected mode by the UE, and the third identifier is used to identify the UE between the UE and a core network device.

Optionally, if the UE obtains the correspondence between the second identifier and the third identifier of the UE by searching the first data packet, the UE obtains the second identifier according to the third identifier of the UE, and receives scheduling information and user data using the second identifier as identification information used in the air-interface connected mode.

Optionally, in some embodiments, the first DCI on the base station side may include a second resource indicator corresponding to the second identifier. Therefore, when the UE searches the first DCI for the second resource indicator corresponding to the second identifier, the method may further include searching, by the UE, the first DCI for the second resource indicator corresponding to the second identifier, and if the first DCI includes the second resource indicator corresponding to the second identifier, receiving, by the UE according to a downlink resource indicated by the second resource indicator, a second data packet sent by the base station, or sending a third data packet according to an uplink resource indicated by the second resource indicator, and continuing, by the UE, to listen to subsequent DCI to determine whether the base station schedules the UE if the first DCI does not include the second resource indicator corresponding to the second identifier.

Optionally, when the UE sends the third data packet according to the uplink resource indicated by the second resource indicator, the third data packet is a paging response message sent by the UE to the core network device, and the first data packet is a paging message sent by the base station at a preset time.

Figure 8A:
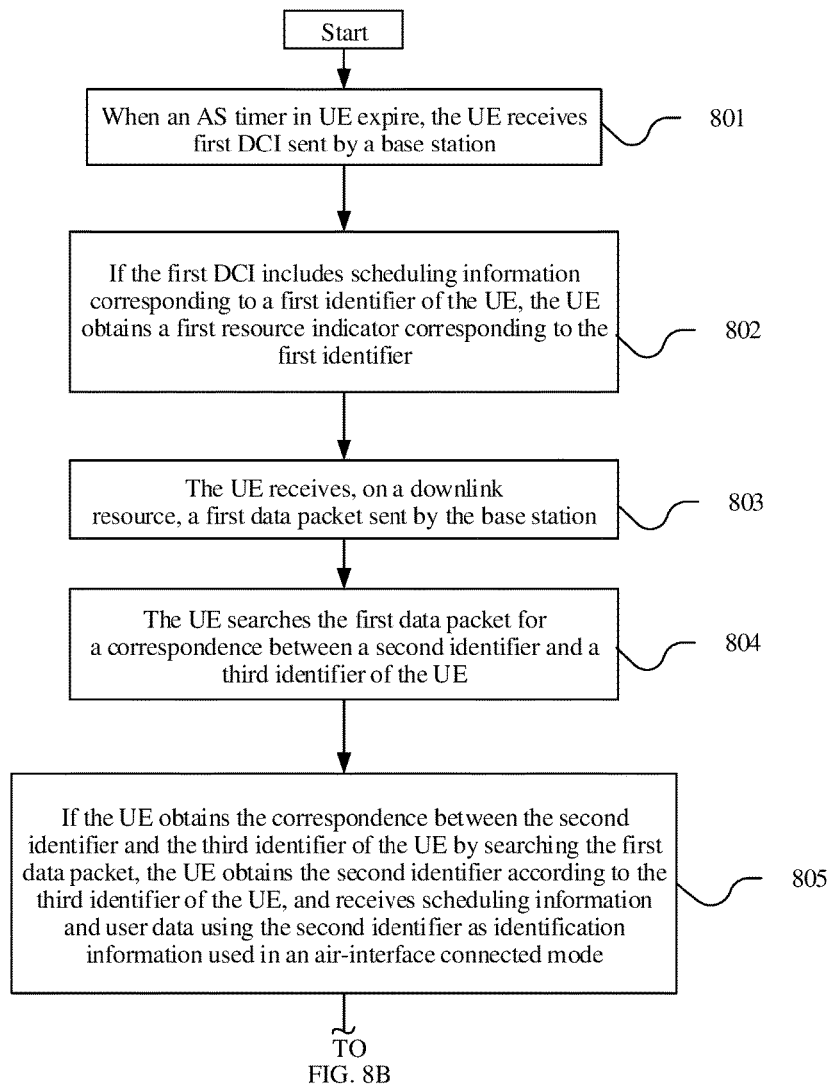
FIG. 8A and FIG. 8B are a schematic diagram of another embodiment of an MTC scheduling method according to the embodiments of the present disclosure.
Figure 8B:
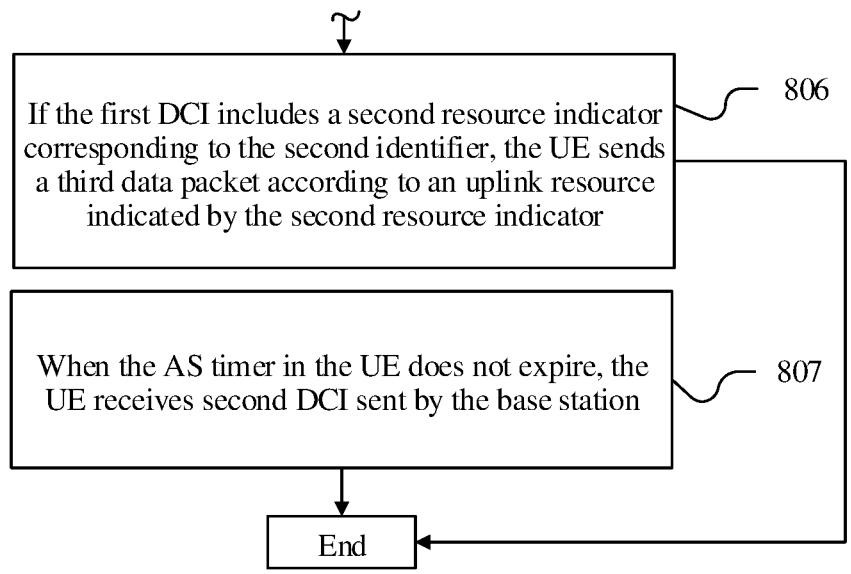

The following provides descriptions using a specific embodiment. Referring to FIG. 8A and FIG. 8B, an embodiment of another MTC scheduling method provided in the embodiments of the present disclosure includes the following steps.

Step 801: When an AS timer in UE expires, the UE receives the first DCI sent by the base station.

Step 802: If the first DCI includes scheduling information corresponding to a first identifier of the UE, the UE obtains a first resource indicator corresponding to the first identifier.

The first identifier is similar to the first identifier in the embodiment shown in FIG. 7, and a resource indicated by the first resource indicator includes a downlink resource. Other details are not described herein again.

Step 803: The UE receives, on the downlink resource, a first data packet sent by the base station.

Step 804: The UE searches the first data packet for a correspondence between a second identifier and a third identifier of the UE.

In this embodiment, the first identifier is an identifier of a preset type as described above, for example, a P-RNTI identifier.

The second identifier and the third identifier are similar to those in the embodiment shown in FIG. 7. Details are not described herein again.

Step 805: If the UE obtains the correspondence between the second identifier and the third identifier of the UE by searching the first data packet, the UE obtains the second identifier according to the third identifier of the UE, and receives scheduling information and user data using the second identifier as identification information used in an air-interface connected mode.

Step 806: If the first DCI includes a second resource indicator corresponding to the second identifier, the UE sends a third data packet according to an uplink resource indicated by the second resource indicator.

In this case, the third data packet may be a paging response message sent by the UE to the core network device. In this case, the first data packet is a paging message sent by the base station at a preset time.

It may be understood that, if the first DCI includes the second resource indicator corresponding to the second identifier, the UE may receive, according to a downlink resource indicated by the second resource indicator, a second data packet sent by the base station. No limitation is set herein.

Step 807: When an AS timer in UE does not expire, the UE receives second DCI sent by the base station.

The second DCI includes a third resource indicator corresponding to a fourth identifier of the target UE, and after receiving the second DCI, the target UE obtains the third resource indicator according to the fourth identifier of the target UE. The fourth identifier is an identifier used for scheduling a resource when the target UE is in the air-interface connected mode, and the fourth identifier and the second identifier are identifiers of one type.

In the foregoing embodiment of The MTC scheduling method on a UE side, optionally, the first identifier of the UE may be a P-RNTI identifier of the UE, and the P-RNTI identifier is calculated by the base station and the UE according to a preset rule, the second identifier of the UE may be a C-RNTI identifier of the UE, and the C-RNTI identifier is allocated by the base station to the UE, and the third identifier of the UE may be a TLLI or an IMSI identity of the UE, the TLLI is allocated by a core network to the UE, and the IMSI is a permanent identifier of the UE.

Optionally, the first identifier of the UE may be a TLLI of the UE. In this case, when receiving and listening to the foregoing DCI with an improved format, the UE may first check whether an RNTI identifier of the UE is scheduled, and then check whether the TLLI corresponding to the UE is scheduled. If the UE is scheduled using the TLLI of the UE, the UE obtains a first resource indicator corresponding to the TLLI, and receives, on a resource indicated by the first resource indicator, the first data packet sent by the base station.

The MTC scheduling method described above is an MTC scheduling method when UE is in an air-interface idle mode. The following describes an MTC scheduling method when UE is in an air-interface connected mode and a ready timer in a base station expires.

Figure 9:
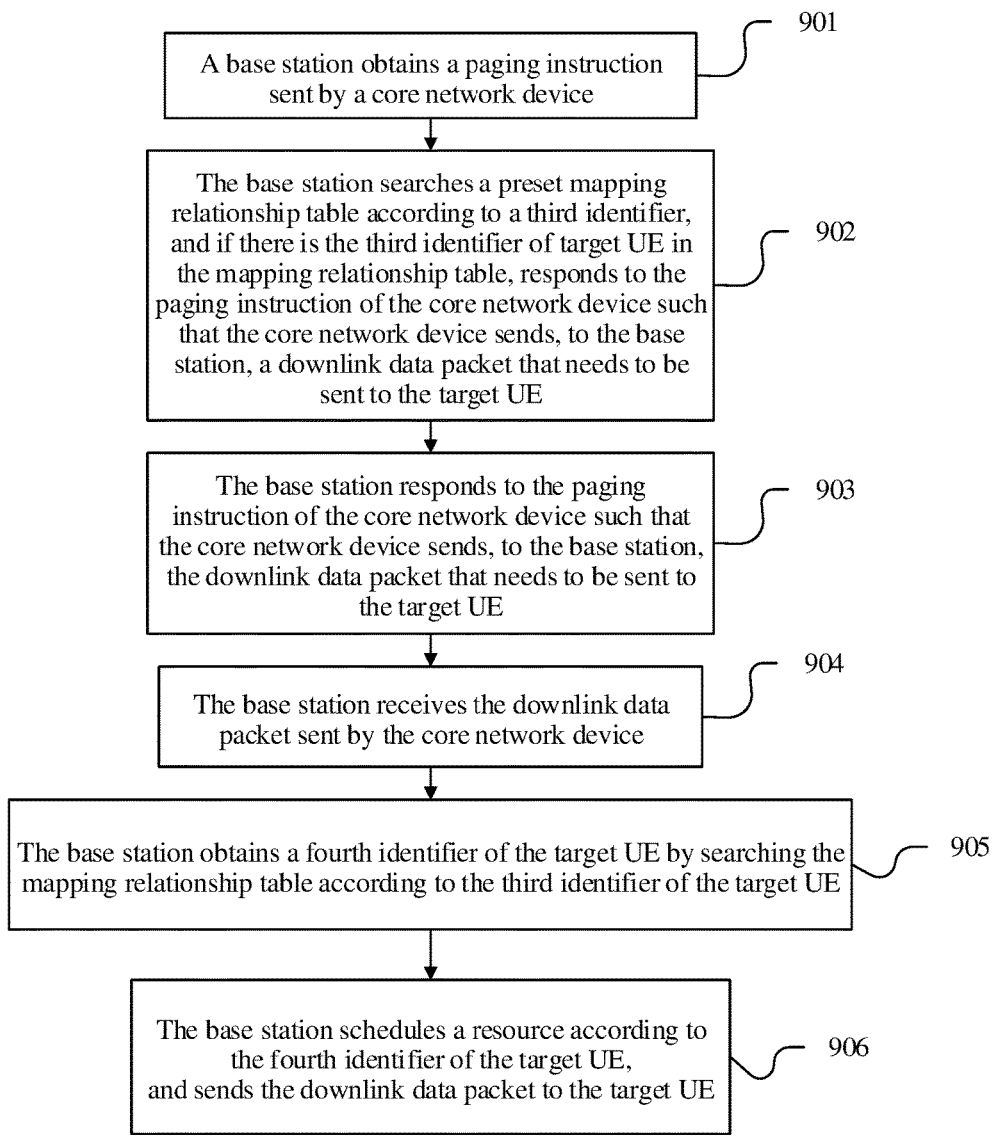
FIG. 9 is a schematic diagram of another embodiment of an MTC scheduling method according to the embodiments of the present disclosure.

Referring to FIG. 9, an embodiment of another MTC scheduling method provided in the embodiments of the present disclosure includes the following steps.

Step 901: A base station obtains a paging instruction sent by a core network device.

When a ready timer in the core network device expires, the core network device sends the paging instruction to base stations of all cells within a routing area. The paging instruction includes a third identifier of target UE, and the third identifier is used to identify the target UE between UE and the core network device.

Step 902: The base station searches a preset mapping relationship table according to the third identifier, and if there is the third identifier of the target UE in the mapping relationship table, responds to the paging instruction of the core network device such that the core network device sends, to the base station, a downlink data packet that needs to be sent to the target UE.

The mapping relationship table includes a one-to-one correspondence between a third identifier of the UE and a fourth identifier of the UE, and the fourth identifier is used for scheduling a resource when the target UE is in an air-interface connected mode.

Step 903: The base station responds to the paging instruction of the core network device such that the core network device sends, to the base station, the downlink data packet that needs to be sent to the target UE.

Step 904: The base station receives the downlink data packet sent by the core network device.

Step 905: The base station obtains a fourth identifier of the target UE by searching the mapping relationship table according to the third identifier of the target UE.

Step 906: The base station schedules a resource according to the fourth identifier of the target UE, and sends the downlink data packet to the target UE.

A manner in which the base station schedules a resource according to the fourth identifier of the target UE, and sends the downlink data packet to the target UE is a common manner in which the base station schedules a resource for the target UE. Further, that the base station schedules a resource according to the fourth identifier of the target UE, and sends the downlink data packet to the target UE may include sending, by the base station, DCI to the target UE, where the DCI includes a resource indicator corresponding to the fourth identifier, the resource indicator is used to indicate a resource used by the target UE during resource scheduling, and the resource includes a downlink resource, and sending, by the base station, the downlink data packet to the target UE using the downlink resource.

In this embodiment of the present disclosure, when a ready timer maintained between a base station and a core network device expires, a manner of a mapping relationship table that is between a third identifier of UE and a fourth identifier of the UE and that is preset in the base station is used, and when the base station receives a paging instruction that includes a third identifier in the corresponding table, the base station responds to the paging instruction, then receives downlink data that the core network device needs to send to target UE, obtains a fourth identifier of the target UE based on a correspondence between the third identifier and the fourth identifier, schedules a resource according to the fourth identifier of the target UE, and sends the downlink data packet to the target UE. This avoids a problem that when a ready timer maintained between a base station and a core network device expires, downlink data that the core network device needs to send to target UE cannot be sent to the target UE because the UE listens only to scheduling that is based on a fourth identifier of the UE.

Optionally, before the base station searches the preset mapping relationship table according to the third identifier, the method may further include establishing, by the base station, the mapping relationship table for subsequent use. Certainly, the mapping relationship table may be the established mapping relationship table obtained from another device before the base station searches the preset mapping relationship table according to the third identifier. No limitation is set herein.

Optionally, when the ready timer in the core network device expires, the paging instruction is sent by the core network device to the base station.

Optionally, the third identifier of the UE is a TLLI or an IMSI of the UE, and the fourth identifier of the UE is a C-RNTI identifier of the UE, and the C-RNTI identifier is allocated by the base station to the UE.

Preferably, the following content may be fixed in a protocol. The paging instruction sent by the core network device mandatorily includes a TLLI of the target UE regardless of whether the third identifier of the UE is a TLLI or an IMSI of the UE.

Figure 10:
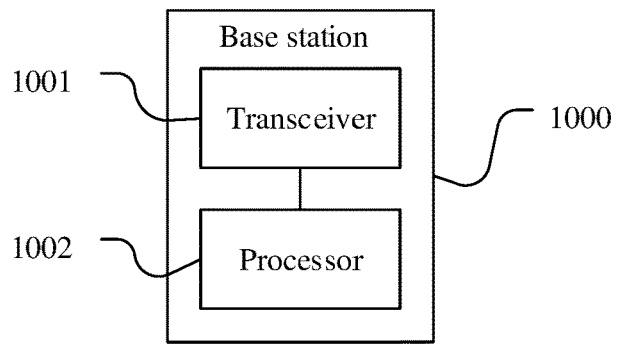
FIG. 10 is a schematic diagram of an embodiment of a base station according to the embodiments of the present disclosure.

The following describes an embodiment of a base station according to the embodiments of the present disclosure. Referring to FIG. 10, a base station 1000 in the embodiments of the present disclosure includes a transceiver 1001 and a processor 1002.

The transceiver 1001 is configured to send first DCI to UE in an air-interface idle mode in a serving cell of the base station 1000, where the first DCI includes a first resource indicator corresponding to a first identifier of target UE, the first identifier is an identifier used by the base station 1000 for scheduling the target UE when the target UE is in the air-interface idle mode, the first resource indicator is used to indicate a resource used by the target UE during resource scheduling, and the resource includes a downlink resource, and the processor 1002 is configured to send a first data packet to the target UE using the downlink resource.

Optionally, the first identifier is an identifier of a preset type, and the first data packet includes a correspondence between a third identifier and a second identifier of the target UE such that the target UE obtains the second identifier according to the third identifier of the target UE after receiving the first data packet. The second identifier is an identifier that is newly allocated by the base station 1000 to the target UE in the air-interface idle mode and that is used for entering an air-interface connected mode by the target UE, and the third identifier is used to identify the target UE between the target UE and a core network device.

Optionally, the first DCI further includes a second resource indicator corresponding to the second identifier, and the processor 1002 is further configured to allocate a downlink resource to the target UE according to the second resource indicator, and the transceiver 1001 is further configured to send a second data packet on the downlink resource, or the processor 1002 is further configured to allocate an uplink resource to the target UE according to the second resource indicator such that the target UE sends a third data packet on the uplink resource.

Optionally, the transceiver 1001 is further configured to send the first DCI to the target UE when an AS timer in the base station expires. The processor 1002 allocates the downlink resource to the target UE according to the second resource indicator, and the transceiver 1001 sends the second data packet on the downlink resource, where the second data packet is sent by the core network device to the base station 1000 when a ready timer in the core network device does not expire, and when the AS timer in the base station 1000 does not expire, the transceiver 1001 is further configured to send second DCI to the target UE, where the second DCI includes a third resource indicator corresponding to a fourth identifier of the target UE such that the target UE obtains the third resource indicator according to the fourth identifier of the target UE after receiving the second DCI, and the fourth identifier is an identifier used for scheduling a resource when the target UE is in the air-interface connected mode, and the fourth identifier and the second identifier are identifiers of one type.

Optionally, the transceiver 1001 is further configured to send the first DCI to the target UE when paging request signaling sent by the core network device is received, and an AS timer in the base station expires, and the processor 1002 allocates the uplink resource to the target UE according to the second resource indicator such that the target UE sends the third data packet on the uplink resource, where the third data packet is a paging response message sent by the target UE to the core network device, and the first data packet is a paging message sent by the base station at a preset time.

Optionally, the first identifier of the target UE is a P-RNTI identifier of the target UE, and the P-RNTI identifier is calculated by the base station and the UE according to a preset rule, the second identifier of the target UE is a C-RNTI identifier of the target UE, and the C-RNTI identifier is allocated by the base station to the UE, and the third identifier of the target UE is a TLLI or an IMSI of the target UE.

Optionally, the first identifier of the target UE is a TLLI of the target UE.

In this embodiment of the present disclosure, when UE is in an air-interface idle mode, a transceiver 1001 sends first DCI to the UE in the air-interface idle mode in a cell. The first DCI includes a first resource indicator corresponding to a first identifier of the target UE. The first identifier is used for scheduling a resource when the target UE is in the air-interface idle mode. Therefore, this effectively avoids a problem in MTC that when UE is in an air-interface idle mode, a base station cannot schedule the UE and send a corresponding downlink data packet.

Figure 11:
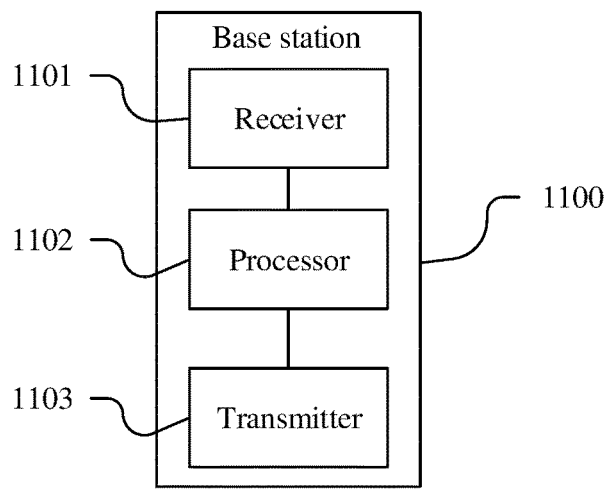
FIG. 11 is a schematic diagram of another embodiment of a base station according to the embodiments of the present disclosure.

The following describes another embodiment of a base station according to the embodiments of the present disclosure. Referring to FIG. 11, a base station 1100 includes a receiver 1101, a processor 1102, and a transmitter 1103.

The receiver 1101 is configured to receive a paging instruction sent by a core network device, where the paging instruction includes a third identifier of target UE, and the third identifier is used to identify the target UE between UE and the core network device. The processor 1102 is configured to search a preset mapping relationship table according to the third identifier, where the mapping relationship table includes a one-to-one correspondence between a third identifier of the UE and a fourth identifier of the UE, and if there is the third identifier of the target UE in the mapping relationship table, the transmitter 1103 responds to the paging instruction of the core network device such that the core network device sends, to the base station 1100, a downlink data packet that needs to be sent to the target UE, where the fourth identifier is used for scheduling a resource when the target UE is in an air-interface connected mode. The receiver 1101 is further configured to receive the downlink data packet sent by the core network device. The processor 1102 is further configured to obtain a fourth identifier of the target UE by searching the mapping relationship table according to the third identifier of the target UE, and the processor 1102 is further configured to schedule a resource according to the fourth identifier of the target UE, and send the downlink data packet to the target UE.

Optionally, the transmitter 1103 is further configured to send DCI to the target UE, where the DCI includes a resource indicator corresponding to the fourth identifier, the resource indicator is used to indicate a resource used by the target UE during resource scheduling, and the resource includes a downlink resource, and the transmitter 1103 is further configured to send the downlink data packet to the target UE using the downlink resource.

Optionally, the third identifier of the UE is a TLLI or an IMSI of the UE, and the fourth identifier of the UE is a C-RNTI identifier of the UE, and the C-RNTI identifier is allocated by the base station 1100 to the UE.

Optionally, the paging instruction sent by the core network device includes a TLLI of the target UE.

In this embodiment, when a ready timer maintained between the base station 1100 and a core network device expires, a manner of a mapping relationship table that is between a third identifier of UE and a fourth identifier of the UE and that is preset in the base station 1100 is used, and when the receiver 1101 receives a paging instruction that includes a third identifier in the corresponding table, the receiver 1101 responds to the paging instruction, and then, the receiver 1101 receives downlink data that the core network device needs to send to target UE, the processor 1102 obtains the fourth identifier of the target UE based on a correspondence between the third identifier and the fourth identifier, and schedules a resource according to the fourth identifier of the target UE, and the transmitter 1103 sends the downlink data packet to the target UE. This effectively avoids a problem in MTC that when a ready timer maintained between a base station and a core network device expires, downlink data that the core network device needs to send to target UE cannot be sent to the target UE because the UE listens only to scheduling that is based on a fourth identifier of the UE.

Figure 12:
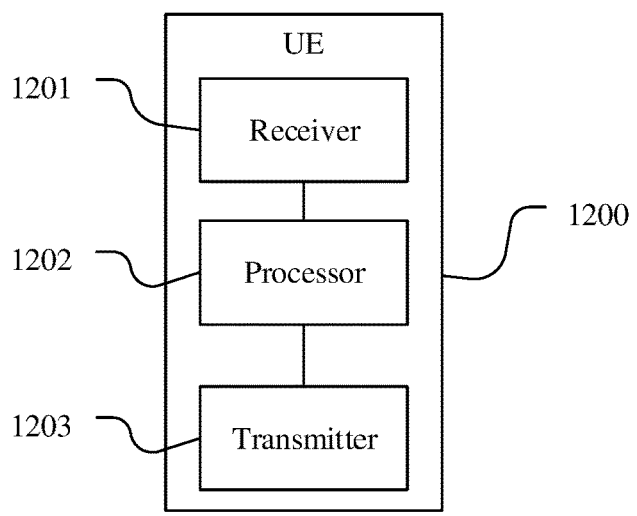
FIG. 12 is a schematic diagram of an embodiment of UE according to the embodiments of the present disclosure.

The embodiments of the base station in the embodiments of the present disclosure are described above, and the following describes an embodiment of UE in the embodiments of the present disclosure. Referring to FIG. 12, an embodiment of UE 1200 in the embodiments of the present disclosure includes a receiver 1201, a processor 1202, and a transmitter 1203.

The receiver 1201 is configured to listen, at a preset time, to first DCI sent by a base station when the UE 1200 is in an air-interface idle mode. If the first DCI includes scheduling information corresponding to a first identifier of the UE 1200, the processor 1202 is configured to obtain a first resource indicator corresponding to the first identifier, where the first identifier is an identifier used by the base station for scheduling the target UE when the target UE is in the air-interface idle mode, the first resource indicator is used to indicate a resource used by the target UE during resource scheduling, and the resource includes a downlink resource, and the receiver 1201 is further configured to receive, on the downlink resource, a first data packet sent by the base station.

Optionally, the first identifier is an identifier of a preset type, and the processor 1202 is further configured to search the first data packet for a correspondence between a second identifier and a third identifier of the UE 1200 after the receiver 1201 receives, on the downlink resource, the first data packet sent by the base station, the second identifier is an identifier that is newly allocated by the base station to the UE 1200 in the air-interface idle mode and that is used for entering an air-interface connected mode by the UE 1200. The third identifier is used to identify the UE 1200 between the UE 1200 and a core network device, and if the correspondence between the second identifier and the third identifier of the UE 1200 is obtained by searching the first data packet, the processor 1202 is further configured to obtain the second identifier according to the third identifier of the UE 1200, and receive scheduling information and user data using the second identifier as identification information used in the air-interface connected mode.

Optionally, the processor 1202 is further configured to search the first DCI for a second resource indicator corresponding to the second identifier, and if the first DCI includes the second resource indicator corresponding to the second identifier, the receiver 1201 is further configured to receive, according to a downlink resource indicated by the second resource indicator, a second data packet sent by the base station, or the transmitter 1203 is configured to send a third data packet according to an uplink resource indicated by the second resource indicator, and if the first DCI does not include the second resource indicator corresponding to the second identifier, the receiver 1201 continues to listen to subsequent DCI to determine whether the base station schedules the UE 1200.

Optionally, when the transmitter 1203 sends the third data packet according to the uplink resource indicated by the second resource indicator, the third data packet is a paging response message sent by the UE 1200 to the core network device, and the first data packet is a paging message sent by the base station at a preset time.

Optionally, the first identifier of the UE 1200 is a P-RNTI identifier of the UE 1200, and the P-RNTI identifier is calculated by the base station and the UE 1200 according to a preset rule, the second identifier of the UE 1200 is a C-RNTI identifier of the UE, and the C-RNTI identifier is allocated by the base station to the UE 1200, and the third identifier of the UE 1200 is a TLLI or an IMSI of the UE 1200.

Optionally, the first identifier of the UE 1200 is a TLLI of the UE 1200.

Various technologies described in this specification may be applied to various communications systems that include second generation (2G) and third generation (3G) communications systems and a next-generation communications system, for example, a 2G communications system such as a GSM, a 3G communications system such as a Wideband Code Division Multiple Access (WCDMA) system or a Time Division-Synchronous Code Division Multiple Access (TD-SCDMA) system, and a next-generation communications system such as an LTE communications system or a subsequent evolved system.

In the foregoing embodiments, the description of each embodiment has respective focuses. For a part that is not described in detail in an embodiment, refer to related descriptions in other embodiments.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A machine type communication (MTC) scheduling method, comprising:
   sending, by a base station, first downlink control information (DCI) to a user equipment (UE) in an air-interface idle mode in a serving cell of the base station, the first DCI comprising a first resource indicator corresponding to a first identifier of a target UE, the first identifier being used by the base station for scheduling the target UE when the target UE is in the air-interface idle mode, the first resource indicator indicating a resource used by the target UE during resource scheduling, the resource comprising a downlink resource, and the first identifier comprising an identifier of a preset type; and
   sending, by the base station, a first data packet to the target UE using the downlink resource, the first data packet comprising a correspondence between a second identifier and a third identifier of the target UE, the second identifier comprising an identifier that is newly allocated by the base station to the target UE in the air-interface idle mode, and the third identifier identifying the target UE between the target UE and a core network device.

2. A machine type communication (MTC) scheduling method, comprising:
   sending, by a base station, first downlink control information (DCI) to a user equipment (UE) in an air-interface idle mode in a serving cell of the base station, the first DCI comprising a first resource indicator corresponding to a first identifier of a target UE, the first identifier being used by the base station for scheduling the target UE when the target UE is in the air-interface idle mode, the first resource indicator indicating a resource used by the target UE during resource scheduling, the resource comprising a downlink resource, the first identifier of the target UE comprising a paging-radio network temporary identity (P-RNTI) identifier of the target UE, the P-RNTI identifier being calculated by the base station and the UE according to a preset rule, a second identifier of the target UE comprising a cell-radio network temporary identity (C-RNTI) identifier of the target UE, the C-RNTI identifier being allocated by the base station to the UE, and a third identifier of the target UE comprising a temporary logical link identifier (TLLI) or an international mobile subscriber identity (IMSI) of the target UE; and
   sending, by the base station, a first data packet to the target UE using the downlink resource.

3. A machine type communication (MTC) scheduling method, comprising:
   listening, by a user equipment (UE) at a preset time, to first downlink control information (DCI) from a base station when the UE is in an air-interface idle mode;
   obtaining, by the UE, a first resource indicator corresponding to a first identifier of the UE when the first DCI comprises scheduling information corresponding to the first identifier of the UE, the first identifier being used by the base station for scheduling the UE when the UE is in the air-interface idle mode, the first resource indicator indicating a resource used by the UE during resource scheduling, the resource comprising a downlink resource, and the first identifier comprising an identifier of a preset type;
   receiving, by the UE on the downlink resource, a first data packet from the base station;
   searching, by the UE, the first data packet for a correspondence between a second identifier and a third identifier of the UE, the second identifier comprising an identifier that is newly allocated by the base station to the UE in the air-interface idle mode and that is used for entering an air-interface connected mode by the UE, and the third identifier identifying the UE between the UE and a core network device;
   obtaining, by the UE, the second identifier according to the third identifier of the UE when the UE obtains the correspondence between the second identifier and the third identifier of the UE; and
   receiving, by the UE, scheduling information and user data using the second identifier as identification information used in the air-interface connected mode.

4. The method of claim 3, wherein the first identifier of the UE comprises a temporary logical link identifier (TLLI) of the UE.

5. A machine type communication (MTC) scheduling method, comprising:
   listening, by a user equipment (UE) at a preset time, to first downlink control information (DCI) from a base station when the UE is in an air-interface idle mode;
   obtaining, by the UE, a first resource indicator corresponding to a first identifier of the UE when the first DCI comprises scheduling information corresponding to the first identifier of the UE, the first identifier being used by the base station for scheduling the UE when the UE is in the air-interface idle mode, the first resource indicator indicating a resource used by the UE during resource scheduling, the resource comprising a downlink resource, the first identifier of the UE comprising a paging-radio network temporary identity (P-RNTI) identifier of the UE, the P-RNTI identifier being calculated by the base station and the UE according to a preset rule, a second identifier of the UE comprising a cell-radio network temporary identity (C-RNTI) identifier of the UE, the C-RNTI identifier being allocated by the base station to the UE, and a third identifier of the UE being a temporary logical link identifier (TLLI) or an international mobile subscriber identity (IMSI) of the UE; and receiving, by the UE on the downlink resource, a first data packet from the base station.

6. A base station, comprising:
a transceiver configured to send first downlink control information (DCI) to a user equipment (UE) in an air-interface idle mode in a serving cell of the base station, the first DCI comprising a first resource indicator corresponding to a first identifier of target UE, the first identifier comprising an identifier used by the base station for scheduling the target UE when the target UE is in the air-interface idle mode, the first resource indicator indicating a resource used by the target UE during resource scheduling, the resource comprising a downlink resource, and the first identifier comprising an identifier of a preset type; and a processor coupled to the transceiver and configured to send a first data packet to the target UE using the downlink resource, the first data packet comprising a correspondence between a third identifier and a second identifier of the target UE, the second identifier comprising an identifier that is newly allocated by the base station to the target UE in the air-interface idle mode, and the third identifier identifying the target UE between the target UE and a core network device.

7. The base station of claim 6, wherein the first DCI further comprises a second resource indicator corresponding to the second identifier, the processor being further configured to allocate a second downlink resource to the target UE according to the second resource indicator, the transceiver being further configured to send a second data packet on the second downlink resource, or the processor king further configured to allocate an uplink resource to the target UE according to the second resource indicator.

8. The base station of claim 7, wherein the transceiver is further configured to:
send the first DCI to the target UE when an access stratum (AS) timer in the base station expires;
send the second data packet on the second downlink resource, the second data packet being received from the core network device when a ready timer in the core network device does not expire; and
send second DCI to the target UE when the AS timer in the base station does not expire, the second DCI comprising a third resource indicator corresponding to a fourth identifier of the target UE, the fourth identifier comprising an identifier used for scheduling a resource when the target UE is in an air-interface connected mode, and the fourth identifier and the second identifier comprising identifiers of one type.

9. The base station of claim 7, wherein the transceiver is further configured to send the first DCI to the target UE when paging request signaling from the core network device is received and an access stratum (AS) timer in the base station expires, the processor being further configured to allocate the uplink resource to the target UE according to the second resource indicator to receive a third data packet from the target user equipment on the uplink resource, the third data packet comprising a paging response message from the target UE to the core network device, and the first data packet comprising a paging message from the base station at a preset time.

10. The base station of claim 6, wherein the first identifier of the target UE comprises a temporary logical link identifier (TLLI) of the target UE.

11. A base station, comprising:
a transceiver configured to send first downlink control information (DCI) to a user equipment (UE) in an air-interface idle mode in a serving cell of the base station, the first DCI comprising a first resource indicator corresponding to a first identifier of target UE, the first identifier comprising an identifier used by the base station for scheduling the target UE when the target UE is in the air-interface idle mode, the first resource indicator indicating a resource used by the target UE during resource scheduling, the resource comprising a downlink resource, the first identifier of the target UE comprising a paging-radio network temporary identity (P-RNTI) identifier of the target UE, the P-RNTI identifier being calculated by the base station and the UE according to a preset rule, a second identifier of the target UE comprising a cell-radio network temporary identity (C-RNTI) identifier of the target UE, the C-RNTI identifier being allocated by the base station to the UE, and a third identifier of the target UE comprising a temporary logical link identifier (TLLI) or an international mobile subscriber identity (IMSI) of the target UE; and a processor coupled to the transceiver and configured to send a first data packet to the target UE using the downlink resource.

12. A user equipment (UE), comprising:
a receiver configured to listen, at a preset time, to first downlink control information (DCI) from a base station when the UE is in an air-interface idle mode;
a processor coupled to the receiver and configured to obtain a first resource indicator corresponding to a first identifier of the UE when the first DCI comprises scheduling information corresponding to the first identifier of the UE, the first identifier being used by the base station for scheduling the UE when the UE is in the air-interface idle mode, the first resource indicator indicating a resource used by the UE during resource scheduling, the resource comprising a downlink resource, and the first identifier comprising an identifier of a preset type,
the receiver being further configured to receive, on the downlink resource, a first data packet from the base station, and
the processor being further configured to:
search the first data packet for a correspondence between a second identifier and a third identifier of the UE after the receiver receives, on the downlink resource, the first data packet from the base station, the second identifier comprising an identifier that is newly allocated by the base station to the UE in the air-interface idle mode for entering an air-interface connected mode by the UE, and the third identifier identifying the UE between the UE and a core network device;

obtain the second identifier according to the third identifier of the UE when the correspondence between the second identifier and the third identifier of the UE is obtained by searching the first data packet; and receive scheduling information and user data using the second identifier as identification information used in the air-interface connected mode.

13. The UE of claim 12, wherein the processor is further configured to search the first DCI for a second resource indicator corresponding to the second identifier, when the first DCI comprises the second resource indicator corresponding to the second identifier, the receiver is further configured to receive, according to a downlink resource indicated by the second resource indicator, a second data packet from the base station, or a transmitter is configured to send a third data packet according to an uplink resource indicated by the second resource indicator, and the receiver is further configured to continue to listen to subsequent DCI to determine whether the base station schedules the UE when the first DCI does not comprise the second resource indicator corresponding to the second identifier.

14. The UE of claim 13, wherein the third data packet comprises a paging response message from the UE to the core network device, and the first data packet comprises a paging message from the base station at a preset time.

15. The UE of claim 12, wherein the first identifier of the UE comprises a temporary logical link identifier (TLLI) of the UE.

16. A user equipment (UE), comprising:

a receiver configured to listen, at a preset time, to first downlink control information (DCI) from a base station when the UE is in an air-interface idle mode;

a processor coupled to the receiver and configured to obtain a first resource indicator corresponding to a first identifier of the UE when the first DCI comprises scheduling information corresponding to the first identifier of the UE, the first identifier being used by the base station for scheduling the UE when the UE is in the air-interface idle mode, the first resource indicator indicating a resource used by the UE during resource scheduling, the resource comprising a downlink resource, the first identifier of the UE comprising a paging-radio network temporary identity (P-RNTI) identifier of the UE, the P-RNTI identifier being calculated by the base station and the UE according to a preset rule, a second identifier of the UE comprising a cell-radio network temporary identity C-RNTI identifier of the UE, the C-RNTI identifier being allocated by the base station to the UE, and a third identifier of the UE comprising a temporary logical link identifier (TLLI) or an international mobile subscriber identity (IMSI) of the UE, and the receiver being further configured to receive, on the downlink resource, a first data packet from the base station.

* * * * *

UNITED STATES PATENT AND TRADEMARK OFFICE
CERTIFICATE OF CORRECTION

PATENT NO. : 10,165,581 B2
APPLICATION NO. : 15/821313
DATED : December 25, 2018
INVENTOR(S) : Xiaolei Tie et al.

Page 1 of 1

It is certified that error appears in the above-identified patent and that said Letters Patent is hereby corrected as shown below:

On the Title Page

Item (30), Line 1: "201510274653" should read "201510274653.3"

In the Claims

Column 33, Line 46: "king" should read "being"

Signed and Sealed this
Nineteenth Day of February, 2019

Andrei Iancu
*Director of the United States Patent and Trademark Office*